(12) United States Patent
Suzuki

(10) Patent No.: US 8,571,381 B2
(45) Date of Patent: *Oct. 29, 2013

(54) IMAGE PROCESSING APPARATUS, IMAGE PROCESSING METHOD, AND PROGRAM

(75) Inventor: Hirotaka Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,439

(22) Filed: Sep. 10, 2012

(65) Prior Publication Data

US 2013/0094831 A1    Apr. 18, 2013

(30) Foreign Application Priority Data

Oct. 18, 2011   (JP) ................................. 2011-228538

(51) Int. Cl.
    *H04N 5/775* (2006.01)
(52) U.S. Cl.
    USPC ......................................................... 386/230
(58) Field of Classification Search
    None
    See application file for complete search history.

(56) References Cited

U.S. PATENT DOCUMENTS

| 7,594,177 B2 * | 9/2009 | Jojic et al. ..................... 715/720 |
| 2006/0120624 A1 * | 6/2006 | Jojic et al. ..................... 382/284 |
| 2007/0223878 A1 * | 9/2007 | Abe et al. ......................... 386/95 |
| 2009/0132510 A1 * | 5/2009 | Dimitrova et al. ................. 707/5 |
| 2010/0111501 A1 * | 5/2010 | Kashima ....................... 386/108 |

FOREIGN PATENT DOCUMENTS

JP    2008-312183 A    12/2008

* cited by examiner

*Primary Examiner* — Thai Tran
*Assistant Examiner* — Sunghyoun Park
(74) *Attorney, Agent, or Firm* — Wolf, Greenfield & Sacks, P.C.

(57) ABSTRACT

An image processing apparatus includes a display control unit displaying a segment map, in which segment-representing images representing video segments obtained by dividing content into video segments which are collections of frames of one or more temporally continuous frames, are arranged on a display apparatus and a reproduction control unit controlling reproduction of the video segments corresponding to the segment-representing image according to a reproduction operation of a user requesting reproduction with respect to the segment-representing image, in which, when, during reproduction of a video segment of content, a reproduction operation is performed with respect to a segment-representing image of another video segment of the content, the reproduction control unit reproduces the other video segment corresponding to the segment-representing image for which the reproduction operation was performed, while still maintaining the reproduction of the video segment being reproduced.

14 Claims, 27 Drawing Sheets

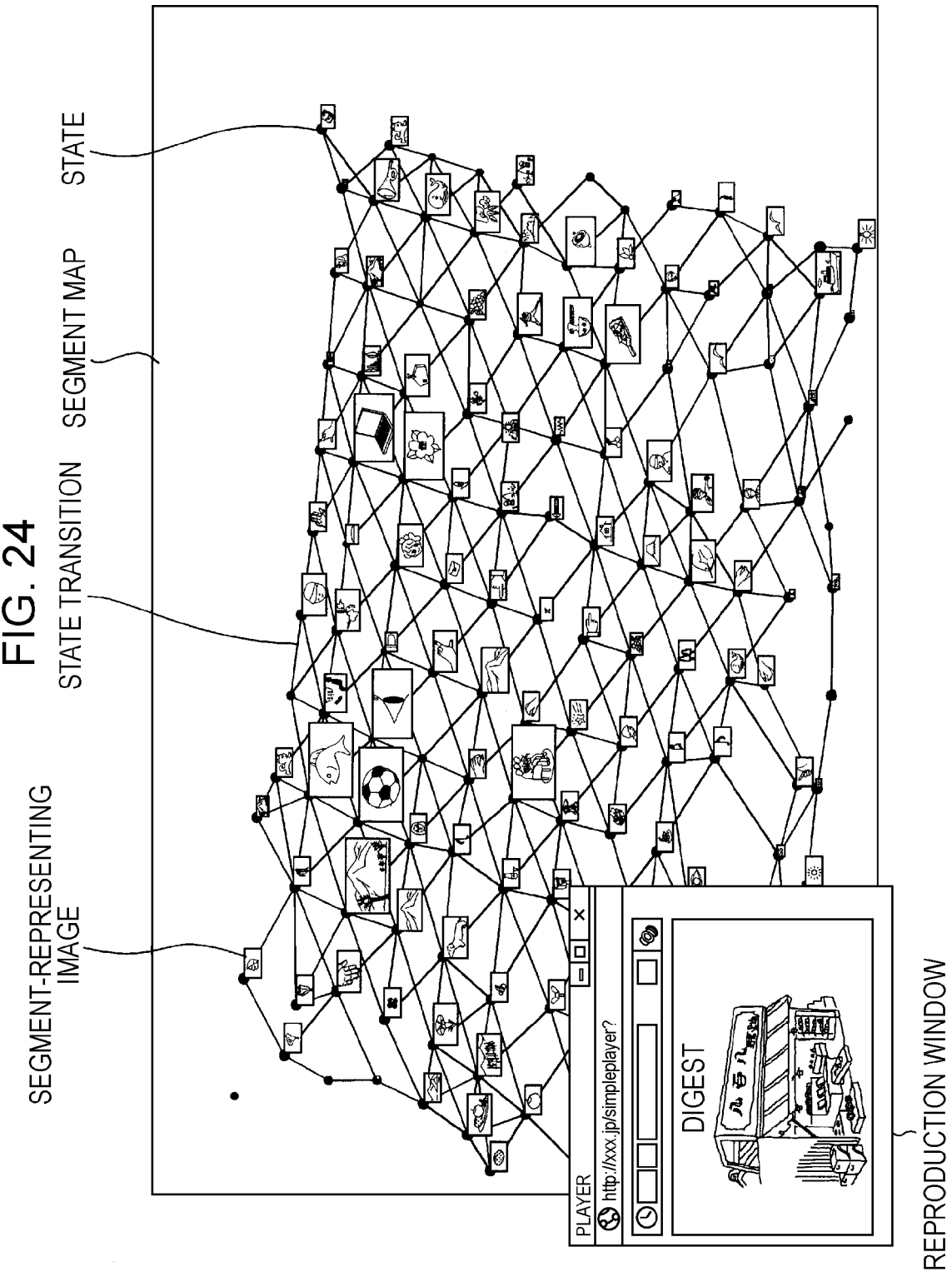

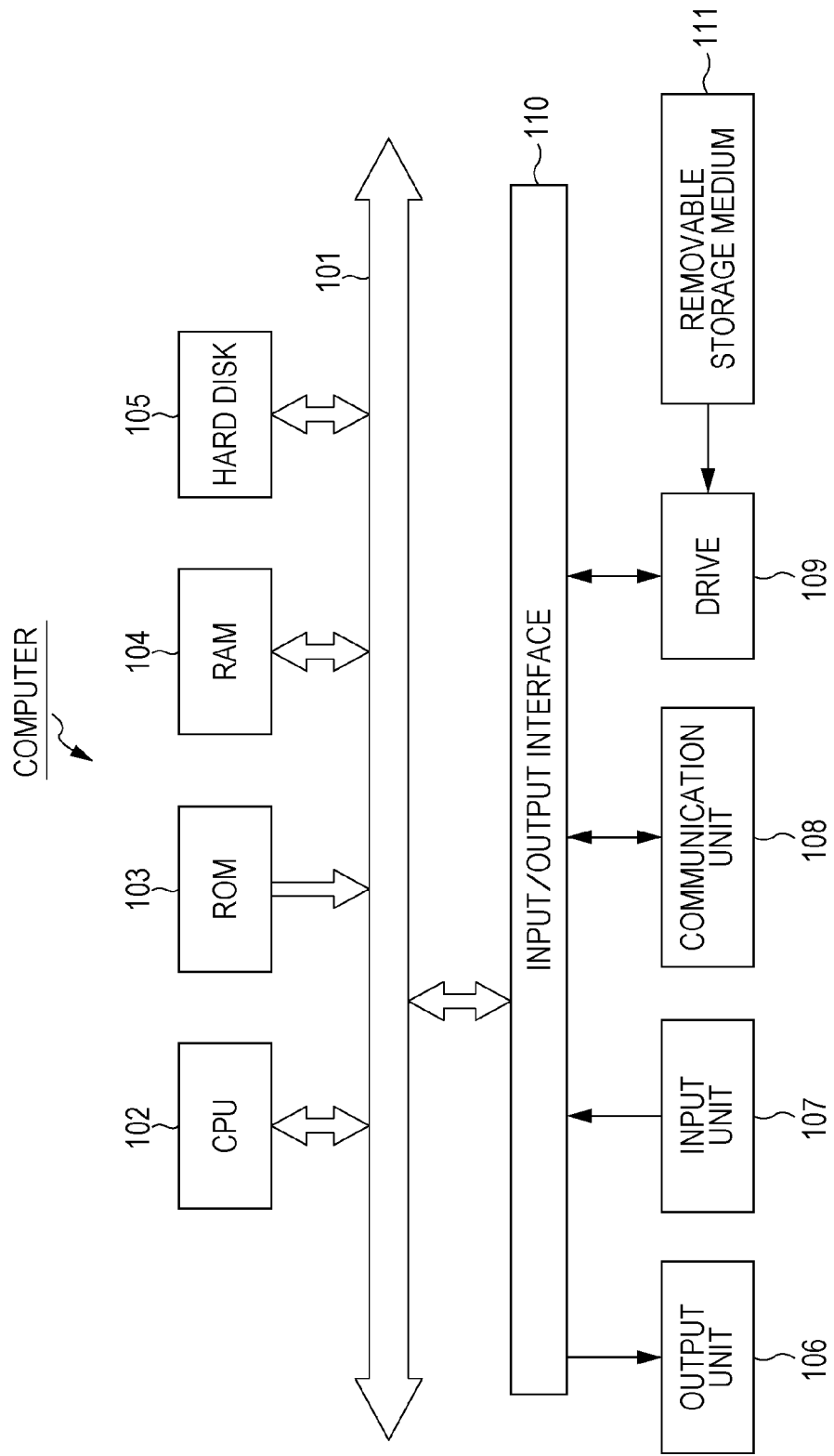

IMAGE PROCESSING APPARATUS, IMAGE PROCESSING METHOD, AND PROGRAM

BACKGROUND

The present technology relates to an image processing apparatus, an image processing method, and a program, in particular, for example, to an image processing apparatus, an image processing method, and a program enabling a user to simultaneously view a plurality of places of a plurality of scenes or the like in which the user has an interest in a single item of content.

For example, to view a scene in which the user has an interest within the content of a video, it is necessary for the user to give an instruction to reproduce that scene, that is, to give an instruction regarding the (position of the) scene which is the target of the reproduction.

To give an instruction regarding the scene which is the target of reproduction, it is necessary for the user to obtain an overview of the scenes included in the content.

As a method for the user to obtain an overview of the scenes included in the content, there is a method of displaying thumbnails of the content.

As the method of displaying thumbnails of the content, for example, there is a method of detecting switching between commercials and the main program, switching between the people and the objects reflected in the images, and the like as scene changes, and generating and displaying thumbnails in which the frames immediately after the scene changes are compressed (for example, refer to Japanese Patent Application Publication No. 2008-312183).

SUMMARY

According to an embodiment of the present disclosure, there is provided a video management application which displays thumbnails of a frame of part of the content in a film roll form and which starts the reproduction from the frame corresponding to the thumbnail when the thumbnail is clicked.

According to the video management application, the user is able to view the scene by looking at the thumbnails, obtaining an overview of the scenes starting with the frame or the like corresponding to the thumbnail, and clicking the thumbnail of the scene of interest.

Here, in the above video application, when the scene (starting from the frame) corresponding to thumbnail A is in the middle of being reproduced as a result of the user clicking on the thumbnails A, in a case where the user looks at another thumbnail B, has an interest in the scene corresponding to the thumbnail B, and attempts to view that scene by clicking on the thumbnail B, the reproduction of the scene corresponding to thumbnail A which had been playing up to this point is stopped and the reproduction of the scene corresponding to thumbnail B is started.

Therefore, even in a case where the user looked at the thumbnails displayed in film roll form and had an interest in scenes respectively corresponding to a plurality of, for example, two, thumbnails A and B, it was difficult to simultaneously view the scenes respectively corresponding to the two thumbnails A and B.

The present technology has been made in view of these circumstances and enables a user to simultaneously view a plurality of places within a single or a plurality of items of content.

According to an embodiment of the present technology, there is provided an image processing apparatus including: a display control unit displaying a segment map, which is a map in which segment-representing images which are images representing the video segments obtained by dividing the content into video segments which are collections of frames of one or more temporally continuous frames are arranged, on a display apparatus; and a reproduction control unit controlling the reproduction of the video segments corresponding to the segment-representing image according to the reproduction operation of the user requesting reproduction with respect to the segment-representing image, in which, in a case where, during the reproduction of a video segment of content, a reproduction operation is performed with respect to a segment-representing image of another video segment of the content, the reproduction control unit reproduces the other video segment which is a video segment corresponding to the segment-representing image for which the reproduction operation was performed while still maintaining the reproduction of the video segment being reproduced, or a program causing a computer to function as the image processing apparatus.

According to an embodiment of the present technology, there is provided an image processing method including: displaying a segment map, which is a map in which segment-representing images which are images representing the video segments obtained by dividing the content into video segments which are collections of frames of one or more temporally continuous frames are arranged, on a display apparatus; and controlling the reproduction of the video segments corresponding to the segment-representing image according to a reproduction operation of the user requesting reproduction with respect to the segment-representing image, in which, in the controlling of the reproduction of the video segment, in a case where, during the reproduction of a video segment of content, a reproduction operation is performed with respect to a segment-representing image of another video segment of the content, the other video segment which is a video segment corresponding to the segment-representing image for which the reproduction operation was performed is reproduced while still maintaining the reproduction of the video segment being reproduced.

According to an embodiment of the present disclosure, a segment map, which is a map in which segment-representing images which are images representing the video segments obtained by dividing the content into video segments which are collections of frames of one or more temporally continuous frames are arranged, is displayed on a display apparatus. Thus, the video segment corresponding to the segment-representing image is reproduced according to the reproduction operation of the user requesting reproduction with respect to the segment-representing image. In a case where, during the reproduction of a video segment of content, a reproduction operation is performed with respect to a segment-representing image of another video segment of the content, the other video segment which is a video segment corresponding to the segment-representing image for which the reproduction operation was performed is reproduced while still maintaining the reproduction of the video segment being reproduced.

In addition, the image processing apparatus may be an independent apparatus, or may be an internal block configuring one apparatus.

In addition, the program is able to be provided through transmission via a transmission medium, or recording on a recording medium.

According to an embodiment of the present technology, the user will be able to simultaneously view a plurality of places within a plurality of scenes in which the user has an interest within a single item of content.

BRIEF DESCRIPTION OF THE DRAWINGS

FIG. 24 is a diagram illustrating the reproduction of a video segment performed by double-clicking a segment-representing image highlighted and displayed in the segment map.

FIG. 26 is a block diagram showing a configuration example of an embodiment of a computer in which the present technology is applied.

DETAILED DESCRIPTION OF EMBODIMENTS

[Embodiment of an Image Processing Apparatus in which the Present Technology is Applied]

Figure 1:
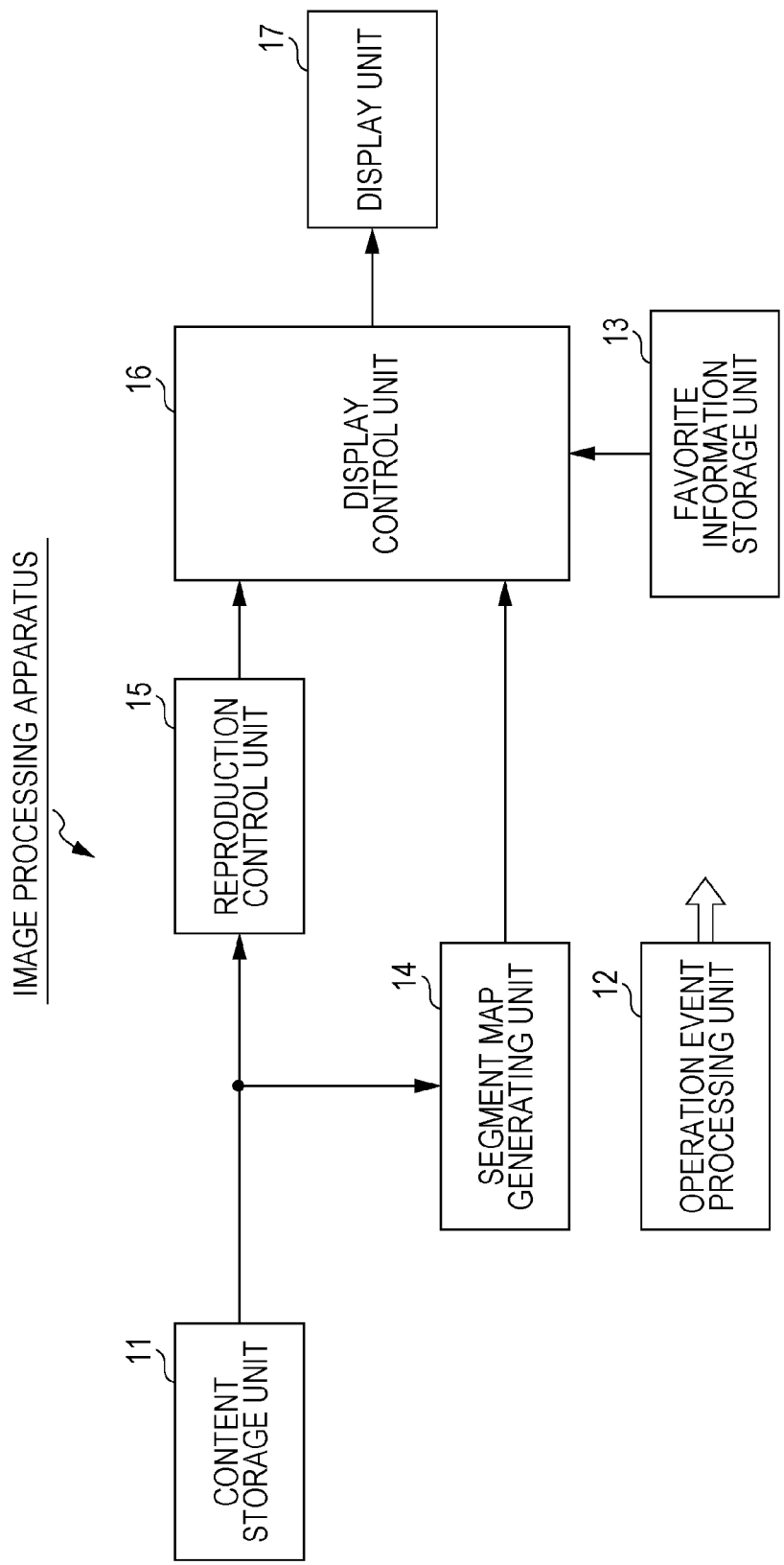
FIG. 1 is a block diagram showing a configuration example of an embodiment of an image processing apparatus in which the present technology is applied.

FIG. 1 is a block diagram showing a configuration example of an embodiment of an image processing apparatus in which the present technology is applied.

In FIG. 1, the image processing apparatus is configured by a content storage unit 11, an operation event processing unit 12, a favorite information storage unit 13, a segment map generating unit 14, a reproduction control unit 15, a display control unit 16, and a display unit 17.

The content storage unit 11, for example, stores (records) content such as programs and the like for television broadcasting. Content stored in the content storage unit 11, for example, is reproduced in accordance with operations of the user.

The operation event processing unit 12 generates events (operation events) in accordance with operations of the user and performs various processes such as control of each block configuring the image processing apparatus according to these operation events.

Here, as the operations of the user (operation event), there are a (single) click, a double click, a tap, a double tap and the like, which are operations of a pointing device such as a mouse or a touch panel. Further, the operation events generated by the operation event processing unit 12 include, for example, information such as a position of a cursor moving along with the mouse, or a position being touched on the touch panel.

According to the control of the operation event processing unit 12, the favorite information storage unit 13 stores information and the like relating to clusters in which, as will be described later, (favorite) video segments in which the user has an interest are clustered as favorite information.

In accordance with control and the like of the operation event processing unit 12, the segment map generating unit 14 generates a two or three-dimensional segment map, which is a map in which segment-representing images, which are images representing the video segments obtained by dividing the content stored in the content storage unit 11 into video segments which are collections of frames of one or more temporally continuous frames, are arranged, and performs supply thereof to the display control unit 16.

In accordance with control of the operation event processing unit 12, the reproduction control unit 15 controls the reproduction of content stored in content storage unit 11.

That is, according to a reproduction operation of a user requesting reproduction with respect to a segment-representing image, the reproduction control unit 15, for example, controls the reproduction of video segments corresponding to the segment-representing image.

Specifically, the reproduction control unit 15 reads the video segment which is a part of the content stored in the content storage unit 11, performs necessary processes such as decoding or the like, and obtains image and audio (data) of the video segment. Here, as well as supplying the image of the video segment to the display control unit 16, reproduction control unit 15 supplies the audio of the video segment to a speaker (not shown) so as to be output.

The display control unit 16 performs display control so as to display an image of the video segment supplied from the reproduction control unit 15, a segment map supplied from the segment map generating unit 14, and the like on the display unit 17.

In addition, the display control unit 16 controls the display of the segment map according to the favorite information stored in the favorite information storage unit 13.

The display unit 17 is configured by a liquid crystal panel, an organic EL (Electro Luminescence) display, or the like and displays an image according to the control of the display control unit 16.

Figure 2:
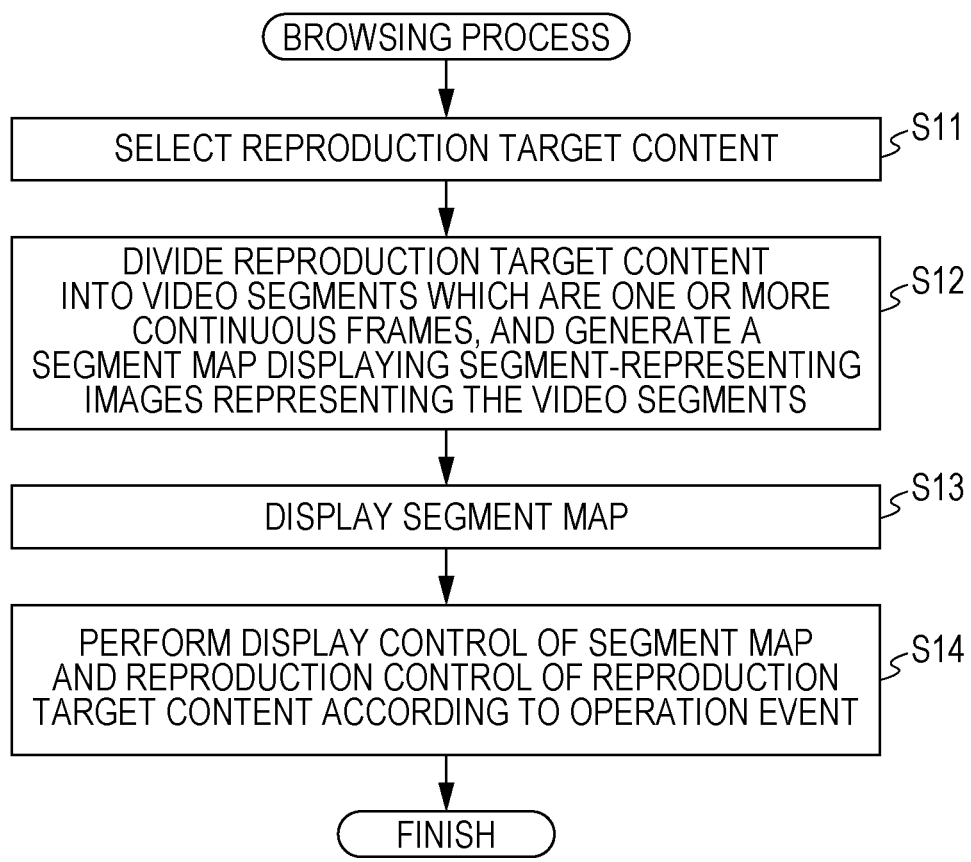
FIG. 2 is a flowchart illustrating a browsing process of the image processing apparatus.

FIG. 2 is a flowchart illustrating a process (browsing process) performed by the image processing apparatus of FIG. 1.

When the user performs an operation giving instructions so as to reproduce content, in step S11, the operation event processing unit 12 selects the content for which there is a reproduction instruction as reproduction target content which is content which is the target of reproduction and controls the segment map generating unit 14 so as to generate a segment map of the reproduction target content, whereby the process proceeds to step S12.

In step S12, the segment map generating unit 14 reads the reproduction target content from the content storage unit 11 and performs a segment map generating process generating a segment map of the reproduction target content.

In other words, the segment map generating unit 14 divides the reproduction target content into video segments which are collections of frames of one or more temporally continuous frames and generates a two or three-dimensional segment map, which is a map in which segment-representing images, which are images representing each video segment are arranged (displayed).

Here, the segment map generating unit 14 supplies the segment map of the reproduction target content to the display control unit 16, whereby the process proceeds from step S12 to step S13.

Here, the segment map of the content is able to be generated in advance and stored in the content storage unit 11 at an arbitrary timing after the content is stored in the content storage unit 11. In this case, in step S12, the content map of the reproduction target content may be simply read from the content storage unit 11.

In step S13, the display control unit 16 displays the segment map of the reproduction target content from the segment map generating unit 14 on the display unit 17, whereby the process proceeds to step S14.

In step S14, according to the operation of the user, that is, the operation event to be generated by the operation event processing unit 12, the reproduction control unit 15 performs reproduction control of the reproduction target content and, along with this, the display control unit 16 performs display control of the segment map.

Thereafter, when the user performs an operation so as to finish the browsing process (when an operation event requesting that the browsing process be finished is generated), the image processing apparatus finishes the browsing process.

Here, in step S14, as the display control of the segment map performed by the display control unit 16, there is a tile image display, a highlighted display, as well as setting (changing) of a display mode of the segment map, and the like to be described later, which are performed according to an instructed position which is a position on the display screen of the display unit 17 on which the segment map is displayed and which is instructed by the user by a cursor or a finger.

In addition, in step S14, as the reproduction control of the reproduction target content performed by the reproduction control unit 15, for example, there is control such as reproducing a plurality of video segments of the reproduction target content in parallel.

In other words, with respect to a segment-representing image of a segment map of reproduction target content displayed on the display unit 17, the user is able to perform a double click or a double tap as a reproduction operation requesting the reproduction of a video segment with respect to the segment-representing image.

In a case where, during the reproduction of a video segment #A which is reproduction target content stored in the content storage unit 11, that is, while the image of the video segment #A is displayed on the display unit 17, a reproduction operation with respect to a segment-representing image of another video segment #B of the reproduction target content is performed, the reproduction control unit 15 starts the reproduction of the video segment #B with respect to the segment-representing image for which the reproduction operation was performed while the reproduction of the video segment #A being reproduced is maintained as is, and the image of the video segment #B is supplied to the display control unit 16.

Accordingly, according to the reproduction control of step S14, the user will be able to simultaneously view a plurality of places of a plurality of scenes or the like in which the user has an interest within a single reproduction target content.

[Configuration Example of Segment Map Generating Unit 14]

Figure 3:
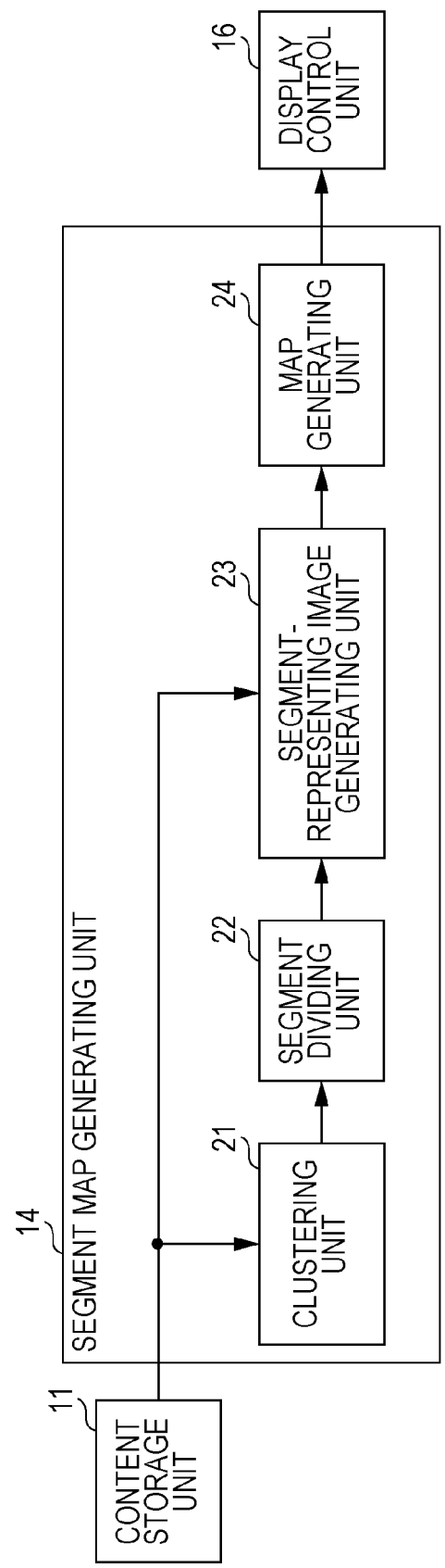
FIG. 3 is a block diagram showing a configuration example of a segment map generating unit.

FIG. 3 is a block diagram showing a configuration example of the segment map generating unit 14 of FIG. 1.

In FIG. 3, the segment map generating unit 14 includes a clustering unit 21, a segment dividing unit 22, a segment-representing image generating unit 23, and a map generating unit 24.

The reproduction target content is supplied from the content storage unit 11 (FIG. 1) to the clustering unit 21.

For example, the clustering unit 21 clusters each frame of the reproduction target content from the content storage unit 11 into clusters of any one of a plurality of clusters determined in advance, and supplies (outputs) the cluster information representing the clustering result thereof to the segment dividing unit 22.

Here, the cluster information includes at least information specifying the cluster to which each frame of the reproduction target content belongs (for example, a unique number or the like representing the cluster).

With regard to a plurality of respective clusters clustered by the clustering unit 21, the segment dividing unit 22 divides the frames belonging to the clusters into video segments which are collections of frames of one or more temporally continuous frames.

That is, the segment dividing unit 22 sequentially selects a plurality of respective clusters that can be clustered by the clustering unit 21 as clusters of interest to be focused on and identifies the frame of the reproduction target content belonging to the cluster of interest based on the cluster information from the clustering unit 21.

In addition, when the frames belonging to the cluster of interest are lined up in chronological order, the segment dividing unit 22 divides these into video segments with the collection of frames of one or more temporally continuous frames as one video segment.

Thus, for example, here, in a case where n1 frames which are continuous from frame t1 of number t1 from the beginning of the reproduction target content and n2 frames which are continuous from frame t2 of number t2 ($>$t1+n1) from the beginning of the reproduction target content belong to a cluster of interest, in the segment dividing unit 22, the n1+n2 frames belonging to the cluster of interest are divided into a video segment having n1 frames continuing from frame t1 of the reproduction target content and n2 frames continuing from frame t2 of the reproduction target content.

Here, the segment dividing unit 22 sets the video segments obtained from the frames belonging to the cluster of interest as the video segment belonging to the cluster of interest and supplies segment information representing this video segment to the segment-representing image generating unit 23.

Here, the segment information includes at least frame information specifying the frame including the video segment (for example, a number representing the number of the frame from the beginning of the reproduction target content) and cluster information representing the cluster to which the video segment (or the frame included in the video segment) belongs.

Segment information of each video segment of the reproduction target content is supplied from the segment dividing unit 22 to the segment-representing image generating unit 23 and reproduction target content is also supplied thereto from the content storage unit 11.

The segment-representing image generating unit 23 generates a segment-representing image representing a video segment for each video segment of the reproduction target content.

In other words, the segment-representing image generating unit 23 identifies all the video segments of the reproduction target content based on the segment information from the segment dividing unit 22 and sequentially selects these as video segments of interest to be focused on.

In addition, based on the segment information from the segment dividing unit 22, the segment-representing image generating unit 23 identifies the frames included in the video segment of interest and, using a frame included in the video segment of interest from the content storage unit 11, generates a segment-representing image representing (content of) the video segment of interest.

Next, the segment-representing image generating unit 23 supplies the segment-representing image of the video segment of interest to the map generating unit 24 with the segment information of the video segment of interest.

Here, as the segment-representing image of the video segment, for example, it is possible to employ thumbnails in which a predetermined frame such as the beginning frame of the video segment is compressed, for instance.

In addition, as the segment-representing image of the video segment, for example, it is possible to employ an image such as an animated GIF displaying an image, in which a plurality of frames among the frames included in the video segment are compressed, using animation (video).

The map generating unit 24 generates a segment map which is a map in which segment-representing images which are images representing video segments of the reproduction target content from the segment-representing image generating unit 23 are arranged and performs supply thereof to the display control unit 16 (FIG. 1).

[Configuration Example of Clustering Unit 21]

Figure 4:
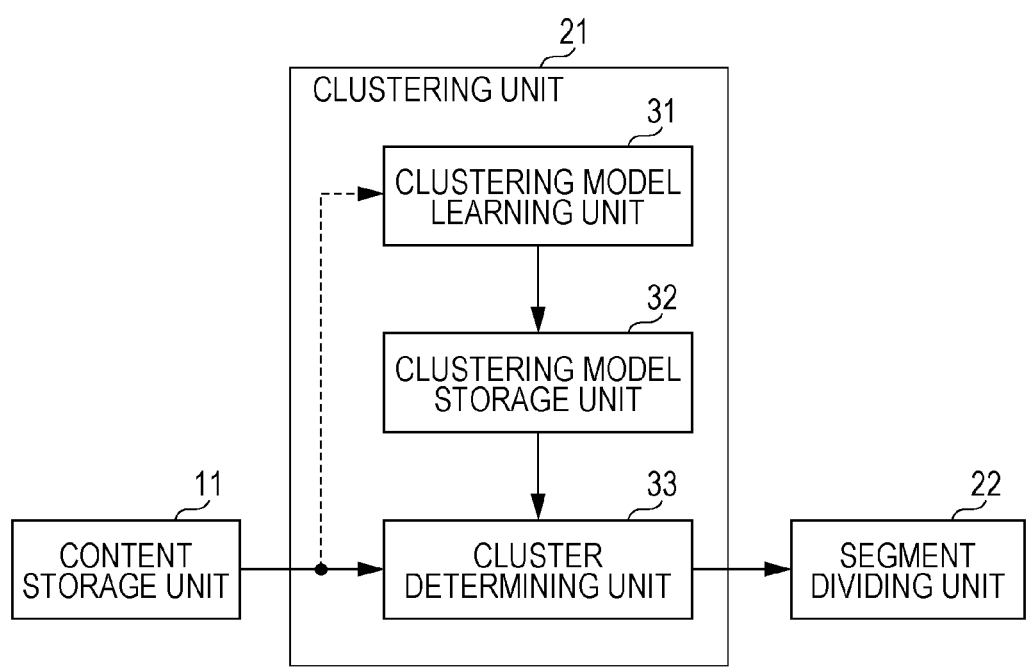
FIG. 4 is a block diagram showing a configuration example of a clustering unit.

FIG. 4 is a block diagram showing a configuration example of the clustering unit 21 in FIG. 3.

In FIG. 4, the clustering unit 21 includes a clustering model learning unit 31, a clustering model storage unit 32, and a cluster determining unit 33.

The clustering model learning unit 31 learns the clustering model which is the model used for clustering each frame of the content and supplies this to clustering model storage unit 32.

Here, as the clustering model, for example, it is possible to employ a state transition model including states and state transitions.

As a state transition model which is a clustering model, for example, it is possible to employ an HMM or the like.

For example, the clustering model learning unit 31 selects one or more items of content belonging to a predetermined category from within the content stored in the content storage unit 11 or the like as the content for learning, and classifies the content for learning according to category.

Here, the content belonging to a predetermined category, for example, signifies content with a common content structure included within the content of programs of the same genre, programs of a series, programs broadcast weekly, daily, or periodically (programs with the same title), and the like.

For example, it is possible to employ "rough" classifications of genres such as sports programs, news programs, or the like; however, "narrow" classification such as soccer match programs or baseball game programs are preferable.

Further, for example, in the case of soccer match programs, it is possible to perform classification into content belonging to different categories for each different channel (broadcasting station).

In addition, the kind of categories to be employed as the categories of the content are, for example, set in advance in the image processing apparatus of FIG. 1.

In addition, for example, the categories of the content stored in the content storage unit 11 are able to be identified from meta-data such as the program title or genre transmitted along with the program in the television broadcast or information or the like of programs provided by sites on the internet.

For each category, the clustering model learning unit 31 uses content for learning of that category, learns of the clustering model of that category, and generates (acquires) a clustering model for each category.

That is, as a clustering model, for example, when employing an HMM, for each category, the clustering model learning unit 31 uses content for learning of that category and performs learning of an HMM as the clustering model.

Here, in the clustering model learning unit 31, it is possible to perform HMM learning as the clustering model using, for example, external content such as sites on the internet as well as content stored in the content storage unit 11 as the content for learning.

The clustering model storage unit 32 stores clustering models for each category generated by the clustering model learning unit 31 or the like.

Here, the learning of the clustering models, for example, is able to be performed at sites or the like on the internet and the clustering model storage unit 32 is able to download (acquire) and store clustering models from such sites.

In such a case, the clustering unit 21 is able to be configured without providing the clustering model learning unit 31.

The cluster determining unit 33 uses the clustering model stored in the clustering model storage unit 32, determines the cluster to which each frame of the reproduction target content supplied from the content storage unit 11 belongs, and supplies (outputs) the cluster information representing the clustering result which is the cluster thereof to the segment dividing unit 22.

[Configuration Example of Clustering Model Learning Unit 31]

Figure 5:
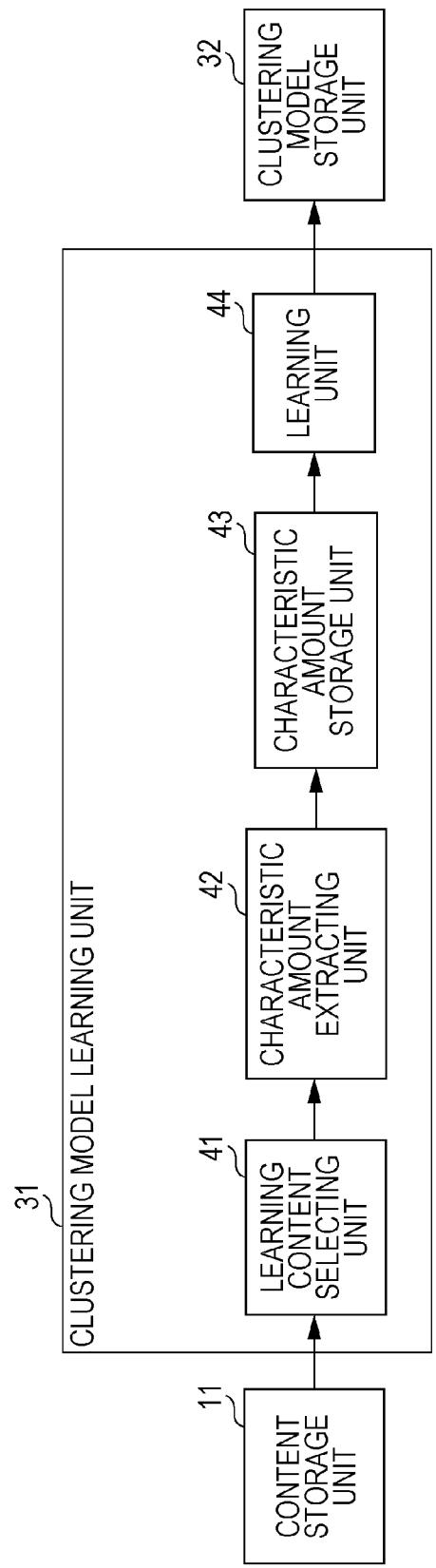
FIG. 5 is a block diagram showing a configuration example of a clustering model learning unit.

FIG. 5 is a block diagram showing a configuration example of the clustering model learning unit 31 of FIG. 4.

The clustering model learning unit 31, for example, sets an HMM (Hidden Marcov Model) which is one state transition model defined by the state transition probability that the state will transition and the observation likelihood that a predetermined observation value will be observed from the state as a clustering model, and extracts the characteristic amounts of each frame of the content for learning which is the content used in the learning of the clustering model. In addition, the clustering model learning unit 31 uses the characteristic amount (characteristic amounts in the chronological order) of each frame of the content for learning and performs HMM learning.

In other words, the clustering model learning unit 31 is configured by a content for learning selecting unit 41, a characteristic amount extracting unit 42, a characteristic amount storage unit 43 and a learning unit 44.

The content for learning selecting unit 41 selects content for HMM learning from within the content stored in the content storage unit 11 as the content for learning, and supplies this to the characteristic amount extracting unit 42.

The characteristic amount extracting unit 42 extracts the characteristic amount (vector) of each frame of the content for learning from the content for learning selecting unit 41 and supplies this to the characteristic amount storage unit 43.

Here, as the characteristic amount of the frame #f, for example, it is possible to employ the characteristic amount of the image of frame #f of GIST or the like, the characteristic amount of the audio of sections of a plurality of frames including frame #f of MFCC (Mel Frequency Cepstrum Coefficient) or the like, position information representing the position of the whole body or the face of a person within the frame #f, or a combination of a plurality of these or the like.

The characteristic amount storage unit 43 stores, in chronological order, the characteristic amounts of each frame of the content for learning supplied from the characteristic amount extracting unit 42.

The learning unit 44 performs HMM learning for each category using the characteristic amounts for each category of each frame of the content for learning stored in the characteristic amount storage unit 43. Further, the learning unit 44 associates the HMM after learning with the category of the content for learning used in the HMM learning, and performs supply thereof to the clustering model storage unit 32 as the clustering model.

Here, HMM is defined by the initial probability $\pi_i$ of state $s_i$, the state transition probability $a_{ij}$, and the observation likelihood $b_i(o)$ in which a predetermined observation value o is observed from the state $s_i$. i and j are indexes representing the state of HMM and are integers in the range of 1 to N in a case where the number of states of HMM is N.

The initial probability $\pi_i$ represents the probability that the state $s_i$ is the initial state (first state) and the state transition probability $a_{ij}$ represents the probability of transitioning from state $s_i$ to state $s_j$.

The observation likelihood $b_i(o)$ represents the likelihood (probability) that the observation value o will be observed from the state $s_i$ at the time of transitioning the state to the state $s_j$. As the observation likelihood $b_i(o)$, in a case where the observation value o is a discrete value, a probability value (discrete value) is used, and, in a case where the observation value o is a continuous value, a probability distribution function is used. As the probability distribution function, for example, it is possible to employ a Gaussian distribution or the like defined by the average value (average vector) and the variance (covariance matrix).

Here, the HMM in which the observation value o is a discrete value is also called discrete HMM and the HMM in which the observation value o is a continuous value is also called continuous HMM.

The HMM learning, for example, is able to be performed using the Baum-Welch algorithm, which is a statistical learning method using an EM algorithm.

According to the HMM as a clustering model, the structure (for example, the structure produced by the program configuration, camera work, or the like) of the content included within the content for learning is acquired in a self-organized manner.

As a result, each state of the HMM as a clustering model corresponds to an element of the structure of the content acquired by learning, and the state transition expresses a temporal transition between elements of the structure of the content.

Here, the HMM state gathers and expresses a frame group (that is, "a similar scene") for which the spatial distance is close and the temporal context is similar in the characteristic amount space (space of the characteristic amount extracted by the characteristic amount extracting unit 42).

Here, for example, the content for learning is a quiz program, roughly, a flow of giving a quiz, offering a hint, answering by the participants, and revealing the correct answer is set as the basic flow of the program, and, when the program progresses using the repetition of this basic flow, the basic flow of the program is equivalent to the structure of the content and the respective giving a quiz, offering a hint, answering by the participants, and revealing the correct answer which configure the flow (structure) are equivalent to elements of the structure of the content.

Further, for example, the progression or the like from the giving a quiz to the offering a hint is equivalent to a temporal transition between elements of the structure of the content.

In addition, as the HMM observation values o, it is possible to use the characteristic amount itself extracted from the frames, or it is possible to use a discrete value in which the characteristic amount extracted from the frames is discretized.

In a case where the characteristic amount itself extracted from the frame is used as the HMM observation value o, the characteristic amount which is the observation value o is a continuous value, and, in the learning unit 44, the continuous HMM obtained as a result of the continuous HMM learning is determined as a clustering model.

On the other hand, in a case where a discrete value in which the characteristic amount extracted from the frames is discretized is used as the HMM observation value o, in the learning unit 44, it is necessary to perform discretization of the characteristic amount extracted from the frame before the HMM learning.

As a method of discretizing the characteristic amount (vector) extracted from the frame, for example, there is vector quantization.

In vector quantization, with reference to a code book in which a finite centroid vector within the characteristic amount space and a code (symbol) representing the centroid vector are associated, the characteristic mount of the continuous values extracted from the frames is converted (discretized) into a code representing a centroid vector of which the characteristic amount and the (Euclidean) distance are the closest.

In addition, the code book used for vector quantization, for example, is able to be determined using a k-means method or the like using the content and the like stored in the content storage unit 11 for each category.

In this case, in the learning unit 44, the characteristic amounts extracted from each frame of the content for learning undergo vector quantization with reference to the code book of the categories of the content for learning. In addition, in the learning unit 44, using the code of the characteristic amounts extracted from each frame of the content for learning obtained as a result of vector quantization, discrete HMM learning is performed and the discrete HMM obtained as a result and the code book used in the vector quantization of the characteristic amount are determined as a clustering model.

In addition, in the learning unit 44, furthermore, it is possible to determine the code book (only) used in the vector quantization described above as the clustering model.

In such a case, in the cluster determining unit 33 (FIG. 4), the characteristic amounts extracted from each frame of the reproduction target content undergo vector quantization using (referring to) the code book as the clustering model and the code obtained as a result is output as cluster information representing the clustering result (cluster of frames) of the frames.

[Configuration Example of Cluster Determining Unit 33]

Figure 6:
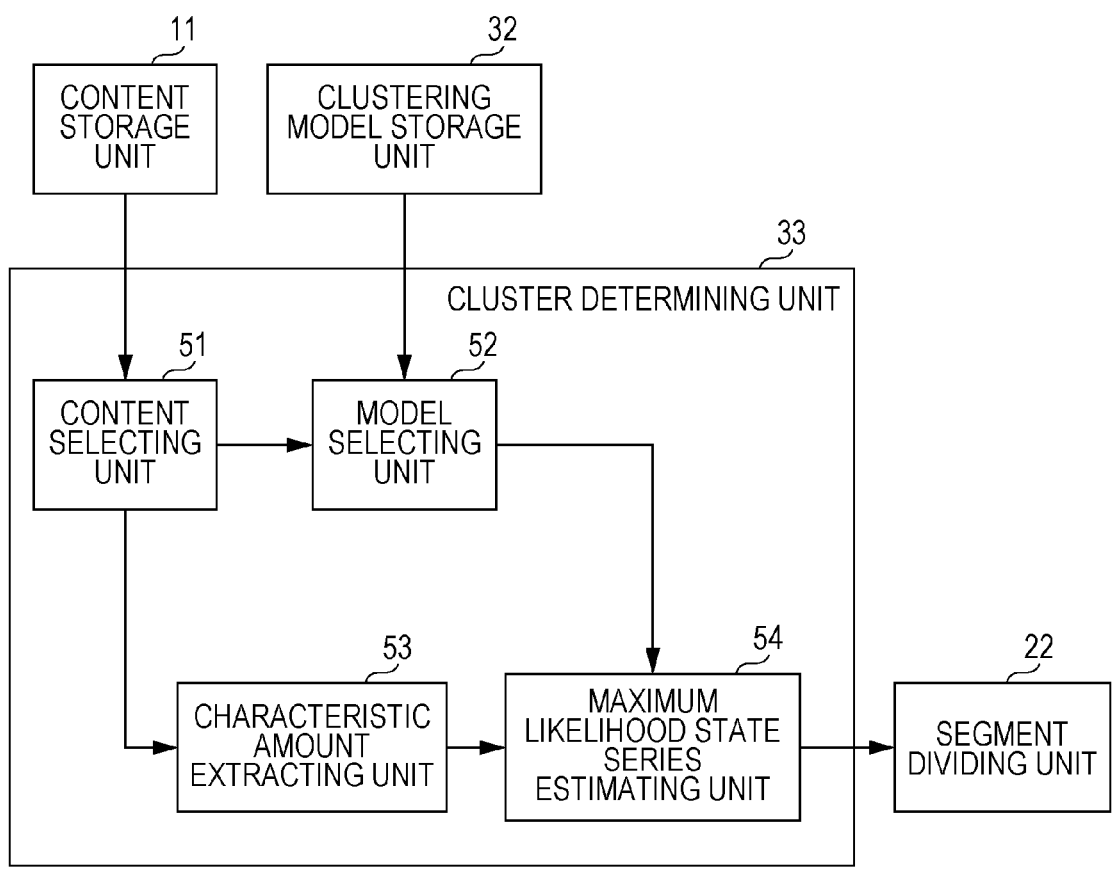
FIG. 6 is a block diagram showing a configuration example of a cluster determining unit.

FIG. 6 is a block diagram showing a configuration example of the cluster determining unit 33 of the clustering unit 21 of FIG. 4.

The cluster determining unit 33 is configured by a content selecting unit 51, a model selecting unit 52, a characteristic amount extracting unit 53, and a maximum likelihood state series estimating unit 54.

The content selecting unit 51 selects reproduction target content from the content stored in the content storage unit 11 and supplies this to the characteristic amount extracting unit 53.

In addition, the content selecting unit 51 identifies the category of the reproduction target content, and supplies this to the model selecting unit 52.

The model selecting unit 52 selects a clustering model (clustering model associated with the category of the reproduction target content) of a category matching the category of the reproduction target content from the content selecting unit 51 from among the clustering models stored in the clustering model storage unit 32 as a model of interest.

Then, the model selecting unit 52 supplies the model of interest to the maximum likelihood state series estimating unit 54.

The characteristic amount extracting unit 53 extracts the characteristic amount of each frame of the reproduction target content supplied from the content selecting unit 51 in the same manner as the characteristic amount extracting unit 42 of FIG. 5, and supplies the characteristic amount (in chronological order) of each frame of the reproduction target content to the maximum likelihood state series estimating unit 54.

For example, in the HMM as the model of interest from the model selecting unit 52, the maximum likelihood state series estimating unit 54 follows a Viterbi algorithm and estimates the maximum likelihood state series which is a state series (in other words, a series of state configuring a Viterbi path) in which the state transition in which the likelihood that the characteristic amounts (in chronological order) of the reproduction target content from the characteristic amount extracting unit 53 will be observed is the highest occurs.

Here, in the HMM as the model of interest, the maximum likelihood state series estimating unit 54 sets an index (below, also referred to a the state ID (identification)) of a state configuring the maximum likelihood state series (below, also referred to as the maximum likelihood state series of the model of interest with respect to the reproduction target content) of a case where the characteristic amount of each frame in the reproduction target content is observed as clustering information representing a clustering result in which each frame of the reproduction target content is clustered and supplies this to the segment dividing unit 22 (FIG. 3).

Here, in the model of interest, the state (t-th state from the beginning configuring the maximum likelihood state series) of time t with reference to the beginning of the maximum likelihood state series (maximum likelihood state series of the model of interest with respect to the reproduction target content) of a case where the characteristic amount of the reproduction target content is observed is set to be represented as $s(t)$ and the number of frames of the reproduction target content is set to be represented as T.

In such a case, the maximum likelihood state series of the model of interest with respect to the reproduction target content is a series of T states of state $s(1), s(2), \ldots, s(T)$, and the t-th state $s(t)$ (state of time t) among these corresponds to the frame (frame t) of time t of the reproduction target content.

Further, when the total number of states of the model of interest is set to be represented by N, the state $s(t)$ of time t is any one among N states of state $s_1, s_2, \ldots, s_N$.

Now, when the state $s(t)$ of time t of the maximum likelihood state series of the model of interest with respect to the reproduction target content is the i-th state $s_i$ in the N states of state $s_1$ to $s_N$, the frame of the time t corresponds to the state $s_i$.

The maximum likelihood state series of the model of interest with respect to the reproduction target content is substantially a series of state IDs of states of any one of N states of state $s_1$ to $s_N$ which correspond to frames of each time t of the reproduction target content.

As described above, the maximum likelihood state series of the model of interest with respect to the reproduction target content expresses the kind of state transition that is caused by the reproduction target content in terms of the model of interest.

In addition, in the maximum likelihood state series of the model of interest with respect to the reproduction target content, as described above, when the state $s(t)$ of time t is set as the i-th state $s_i$ among the N states of state $s_1$ to $s_N$, the frame of time t corresponds to the state $s_i$.

Accordingly, by regarding the respective states of the N states of the model of interest as clusters, the frames of the time t are clustered into a cluster corresponding to the i-th state $s_i$ which is a state $s(t)$ of time t of the maximum likelihood state series among the states of the N states of the model of interest, and, in the estimation of the maximum likelihood state series of the model of interest with respect to the reproduction target content, it is possible to determine the cluster to which each frame of the reproduction target content belongs.

In addition, in a case where the clustering model is a continuous HMM, the maximum likelihood state series estimating unit 54 follows a Viterbi algorithm, estimates the maximum likelihood state series in which the characteristic amounts of each frame of the reproduction target content from the characteristic amount extracting unit 53 are observed in the continuous HMM as the clustering model, and supplies the (state ID of the) state configuring the maximum likelihood state series to the segment dividing unit 22 (FIG. 3) as cluster information of each frame.

In addition, in a case where the clustering model is a discrete HMM and a code book, the maximum likelihood state series estimating unit 54 performs vector quantization on the characteristic amount of each frame of the reproduction target content from the characteristic amount extracting unit 53 using the code book as the clustering model. In addition, the maximum likelihood state series estimating unit 54 follows a Viterbi algorithm, estimates the maximum likelihood state series in which the code obtained by the vector quantization of the characteristic amounts of each frame of the reproduction target content are observed in the discrete HMM as the clustering model, and supplies the (state ID of the) state configuring the maximum likelihood state series to the segment dividing unit 22 as cluster information of each frame.

In addition, in a case where the clustering model is the code book (only), the maximum likelihood state series estimating unit 54 performs vector quantization on the characteristic amount of each frame of the reproduction target content from the characteristic amount extracting unit 53 using the code book as the clustering model, and supplies the code obtained by the vector quantization to the segment dividing unit 22 as cluster information of each frame.

In the segment dividing unit 22 of FIG. 3, as described above, the frames of the reproduction target content belonging to each cluster are identified based on the cluster information supplied from the (maximum likelihood state series estimating unit 54 of the) cluster determining unit 33, and, when the frames belonging to the cluster are lined up in chronological order for each cluster, the collection of frames of one or more temporally continuous frames is set as one video segment and divided into video segments.

[Configuration Example of Map Generating Unit 24]

Figure 7:
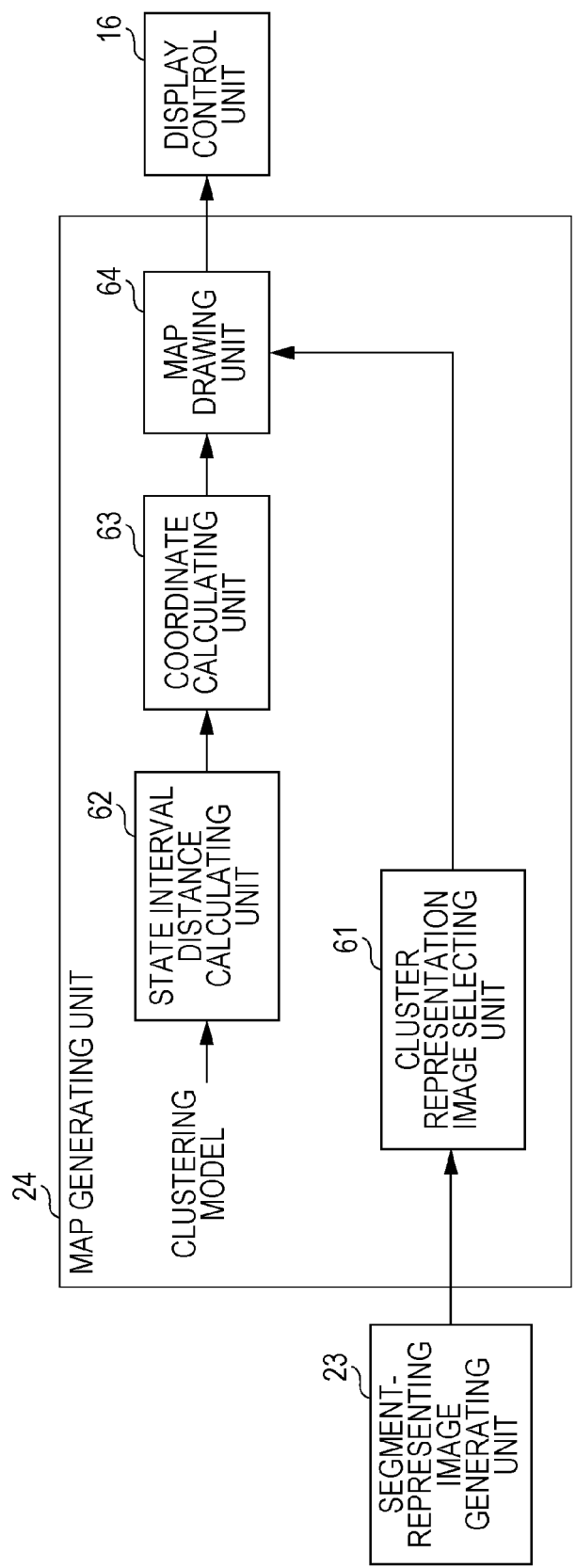
FIG. 7 is a block diagram showing a configuration example of a map generating unit.

FIG. 7 is a block diagram showing a configuration example of the map generating unit 24 of FIG. 3.

The map generating unit 24 is configured by a cluster representation image selecting unit 61, a state interval distance calculating unit 62, a coordinate calculating unit 63 and a map drawing unit 64.

A segment-representing image is supplied to the cluster representation image selecting unit 61 from the segment-representing image generating unit 23 (FIG. 3).

For each cluster (corresponding to each state of the HMM as the model of interest), the cluster representation image selecting unit 61 selects a cluster representation image representing the cluster from the segment-representing images of the video segments belonging to the cluster.

Here, the cluster representation image selecting unit 61 supplies a segment-representing image (of a video segment) belonging to each cluster to the map drawing unit 64 along with a flag representing the segment-representing image selected as the cluster representation image.

Here, in a case where only one segment-representing image belongs to the cluster, the cluster representation image selecting unit 61 selects that segment-representing image as the cluster representation image.

In addition, in a case where a plurality of segment-representing images belong to the cluster, for example, the cluster representation image selecting unit 61 selects one among the plurality of segment-representing images such as the segment-representing image of the video segment for which the number of the frames is the largest or the segment-representing image of the video segment for which the reproduction time is the earliest among the plurality of segment-representing images as the cluster representation image.

The HMM (clustering model) as the model of interest used in the clustering of the reproduction target content in the clustering unit 21 (FIG. 3) is supplied to the state interval distance calculating unit 62.

The state interval distance calculating unit 62 calculates the state interval distance $d_{ij}^*$ from one state $s_i$ of the HMM as the model of interest to another state $s_j$ based on the state transition probability $a_{ij}$ from one state $s_i$ to the other state $s_j$. Here, when the state interval distance $d_{ij}^*$ from an arbitrary state $s_i$ to an arbitrary state $s_j$ of the N states of the HMM as the model of interest is determined, the state interval distance calculating unit 62 supplies a matrix (state interval distance matrix) of N rows and N columns for which the state interval distance $d_{ij}^*$ set as a component to the coordinate calculating unit 63.

Here, in a case where, for example, the state transition probability $a_{ij}$ is greater than a predetermined threshold (for example, $(1/N) \times 10^{-2}$), the state interval distance calculating unit 62 sets the state interval distance $d_{ij}^*$ as 0.1 (small value) for example, and, in a case where the state transition probability $a_{ij}$ is a predetermined threshold or less, sets the state interval distance $d_{ij}^*$ as 1.0 (large value) for example.

The coordinate calculating unit 63 determines the state coordinates $Y_i$ which are coordinates of the position of the state $s_i$ on the model map so as to reduce the error between the Euclidean distance $d_{ij}$ from one state $s_i$ to another state $s_j$ and the state interval distance $d_{ij}^*$ of the state interval distance matrix from the state interval distance calculating unit 62 on the model map which is a two-dimensional or three-dimensional map (map in which the HMM as the model of interest is projected onto a two-dimensional flat surface or a three-dimensional space) in which states $s_i$ to $s_n$ of the N states of the model of interest are arranged.

That is, the coordinate calculating unit 63 determines the state coordinates $Y_i$ so as to minimize the error function E of the Sammon Map which is proportional to the statistical error of the Euclidean distance $d_{ij}$ and the state interval distance $d_{ij}^*$.

Here, the Sammon Map is a multidimensional scaling method and details thereof are described in, for example, J. W. Sammon, JR., "A Nonlinear Mapping for Data Structure Analysis", IEEE Transactions on Computers, vol. C-18, No. 5, May 1969.

In the Sammon Map, for example, in order to minimize the error function E in formula (1), for instance, the state coordinates $Y_i=(x_i, y_i)$ on the model map which is a two-dimensional map are determined.

$$E = 1/(\Sigma d_{ij}) \times \Sigma ((d_{ij}^* - d_{ij})^2 / d_{ij}^*) \qquad (1)$$

Here, in formula (1), $\Sigma$ represents changing the indexes i and j satisfying the formula i<j to integers in the range of 1 to N and taking the summation thereof.

$d_{ij}^*$ represents elements of the i-th row j-th column of the state interval distance matrix and represents the state interval distance from state $s_i$ to state $s_j$. $d_{ij}$ represents the Euclidean distance between the coordinates (state coordinates) $Y_i=(x_i, y_i)$ of the position of the state $s_i$, and the coordinates $Y_j$ of the position of the state $s_j$ of the model map.

In addition, $x_i$ and $y_i$ of the state coordinates $Y_i=(x_i, y_i)$ respectively represent the x coordinate and the y coordinate of the state coordinates $Y_i$ on the two-dimensional model map. In a case where a three-dimensional map is adopted as the model map, the state coordinates $Y_i$ become three-dimensional coordinates having an x coordinate, a y coordinate, and a z coordinate.

The coordinate calculating unit 63 determines the state coordinates $Y_i$ (i=1, 2, ..., N) by repeated application of the gradient method such that the error function E of formula (1) is minimized, and supplies this to the map drawing unit 64.

The map drawing unit 64 converts the HMM as the model of interest to a two-dimensional (or three-dimensional) model map (graphic) by arranging the (image of) the corresponding state $s_i$ at the position of the state coordinates $Y_i$ from the coordinate calculating unit 63 and drawing linking line segments in a built-in memory (not shown) according to the state transition probability between these states.

Here, at the position of the state $s_i$ on the model map, the map drawing unit 64 draws the segment-representing image selected as the cluster representation image of the cluster corresponding to the state $s_i$ from among the segment-representing images from the cluster representation image selecting unit 61.

In this manner, the map drawing unit 64 generates a segment map which is a map in which segment-representing images selected as cluster representation images of clusters corresponding to the states are arranged at the positions of each state on the model map.

In addition, the map drawing unit 64 associates each state of the segment map with the segment-representing images (of the video segment of frames) belonging to the clusters corresponding to those states and supplies the segment map obtained as a result to the display control unit 16 (FIG. 1).

Here, the model map may be said to be an expression of a two-dimensional (or three-dimensional) network (graph) visualizing the structure of the clustering model of the HMM or the like using nodes corresponding to the states and edges corresponding to the state transitions. As the method of converting (projecting) the clustering model of HMM or the like onto the model map as this kind of network expression, it is possible to adopt an arbitrary multidimensional scaling method, as well as the Sammon Map.

In addition, in a case where the clustering model is (only) the code book, the code book as such a clustering model is able to be converted to a model map which is a two-dimensional or a three-dimensional map using a multi-dimensional scaling method such as the Sammon Map, by using reproduction target content for each cluster (each cluster corresponding to each code representing each code vector) corresponding to each code vector, counting the number of transitions (number of times the clusters to which the frames belong transition from each cluster to each cluster) in which the clusters to which the frames in chronological order belong transition (change) in the reproduction target content, and, along with regarding the clusters corresponding to the code vectors as the state of the HMM, regarding the probability corresponding to the number of transitions of each cluster as the state transition probability of the HMM.

Here, as the probability corresponding to the number of transitions of the cluster, for example, it is possible to adopt a value in which the number of transitions is normalized such that, in the number of transitions from such cluster to each cluster, the number of transitions of a threshold or less is converted to 0.0 and furthermore, the sum becomes 1.0.

In addition, as well as determining the number of transitions from each cluster (to each cluster) using the reproduction target content, it is possible to perform determination using all the content used at the time of determining the code book.

[Model Map]

Figure 8:
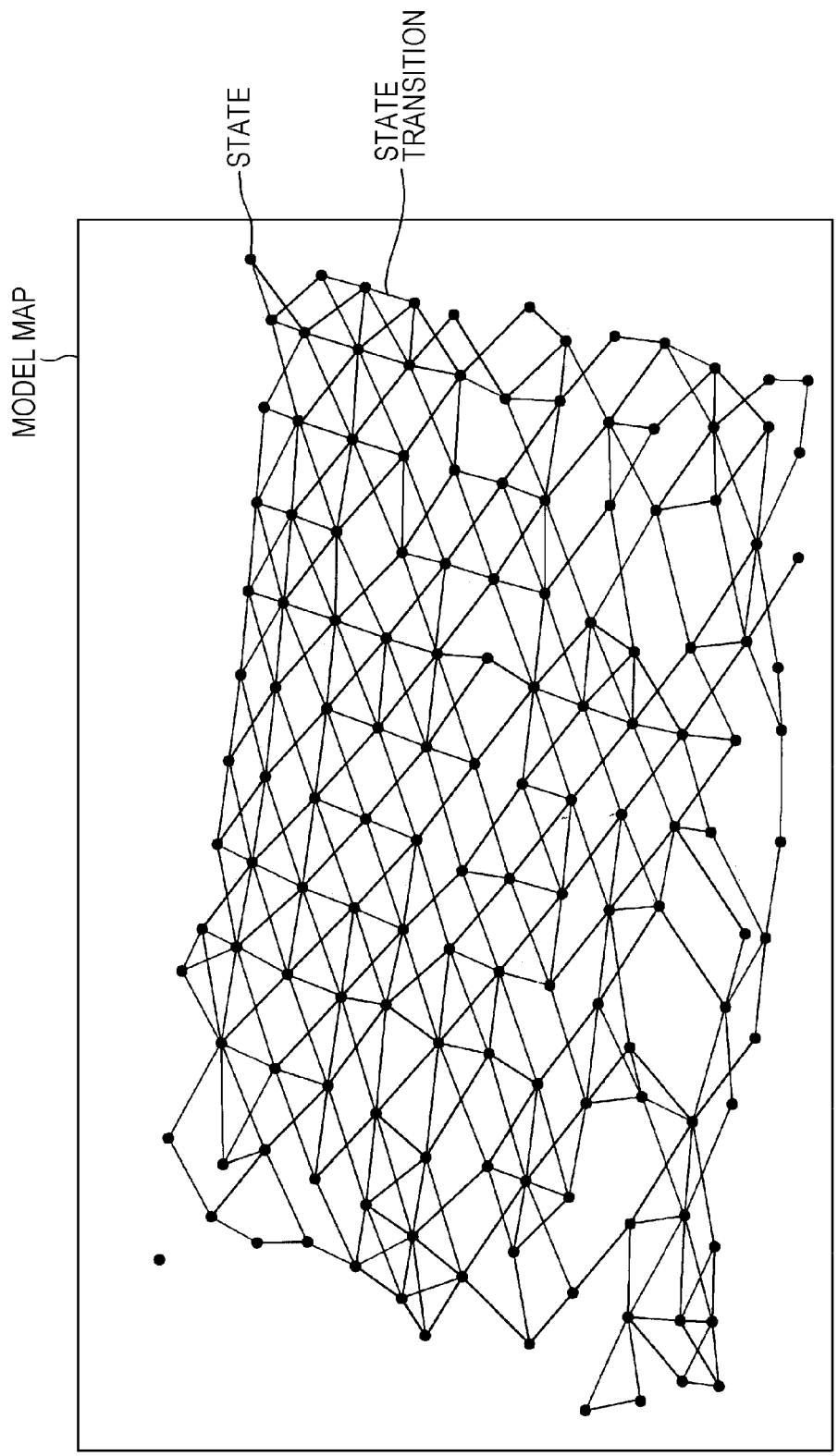
FIG. 8 is a diagram showing an example of a model map drawn by a map drawing unit.

FIG. 8 is a diagram showing an example of a model map drawn by the map drawing unit 64 of FIG. 7.

In the model map in FIG. 8, the points represent the states of the HMM as the clustering model (model of interest) and the line segments linking the points together represent state transitions.

As described above, the model map drawing unit 64 draws (an image of (a point in FIG. 8)) the corresponding state $s_i$ at the position of the state coordinates $Y_i$ determined by the coordinate calculating unit 63.

In addition, the map drawing unit 64 draws a linking line segment between states according to the state transition probability between such states. In other words, the map drawing unit 64 draws linking line segments between the states $s_i$ and $s_j$ in a case where the state transition probability from the state $s_i$ to the other state $s_j$ is larger than a predetermined threshold.

As described above, the map drawing unit 64 draws a model map which is a two-dimensional (or three-dimensional) network expression visualizing the structure of an HMM as a model of interest.

In addition, in the coordinate calculating unit 63 of FIG. 7, in a case where the error function E of formula (1) is adopted as it is and the state coordinates $Y_i$ on the model map are determined so as to minimize the error function E, (the points representing) the states are arranged in a circle on the model map, the states are densely collected at the vicinity of the circumference of the model map (outer side) (outer edge), and it becomes difficult to see the arrangement of the states, that is, visibility may be impaired.

Thus, in the coordinate calculating unit 63 of FIG. 7, it is possible to correct the error function E in formula (1) and determine the state coordinates $Y_i$ on the model map so as to minimize the error function E after correction.

In other words, in the coordinate calculating unit 63, it is determined whether or not the Euclidean distance $d_{ij}$ is greater than a predetermined threshold THd (for example, THd=1.0 or the like).

Here, in a case where the Euclidean distance $d_{ij}$ is not greater than the predetermined threshold THd, the coordinate calculating unit 63 uses the Euclidean distance $d_{ij}$ as it is as the Euclidean distance $d_{ij}$ in the calculation of the error function of formula (1).

On the other hand, in a case where the Euclidean distance $d_{ij}$ is greater than the predetermined threshold THd, the coordinate calculating unit 63 uses the state interval distance $d_{ij}^*$ as the Euclidean distance $d_{ij}$ in the calculation of the error function of formula (1) (sets $d_{ij}=d_{ij}^*$) (Euclidean distance $d_{ij}$ is set to a distance equal to the state interval distance $d_{ij}^*$).

In such a case, in the model map, when focusing on two states $s_i$ and $s_j$ of which the Euclidean distances $d_{ij}$ are close to a certain extent (not greater than the threshold THd), the state coordinates $Y_i$ and $Y_j$ are changed so that the Euclidean distance $d_{ij}$ and the state interval distance $d_{ij}^*$ match (so that the Euclidean distance $d_{ij}$ approaches the state interval distance $d_{ij}^*$).

On the other hand, in the model map, when focusing on two states $s_i$ and $s_j$ of which the Euclidean distances $d_{ij}$ are far apart to a certain extent (greater than the threshold THd), the state coordinates $Y_i$ and $Y_j$ are not changed.

As a result, since the two states $s_i$ and $s_j$ in which the Euclidean distances $d_{ij}$ are to a certain extent far apart are set so that the Euclidean distances $d_{ij}$ remain far apart, it is possible to prevent the states from becoming densely collected at the vicinity (outer edge) of the circumference of the model map, and also to prevent the visualization from being impaired.

For the model map in FIG. 8, as described above, the states are prevented from becoming densely collected at the vicinity (outer edge) of the circumference of the model map.

[Processing of Segment Map Generating Unit 14]

Figure 9:
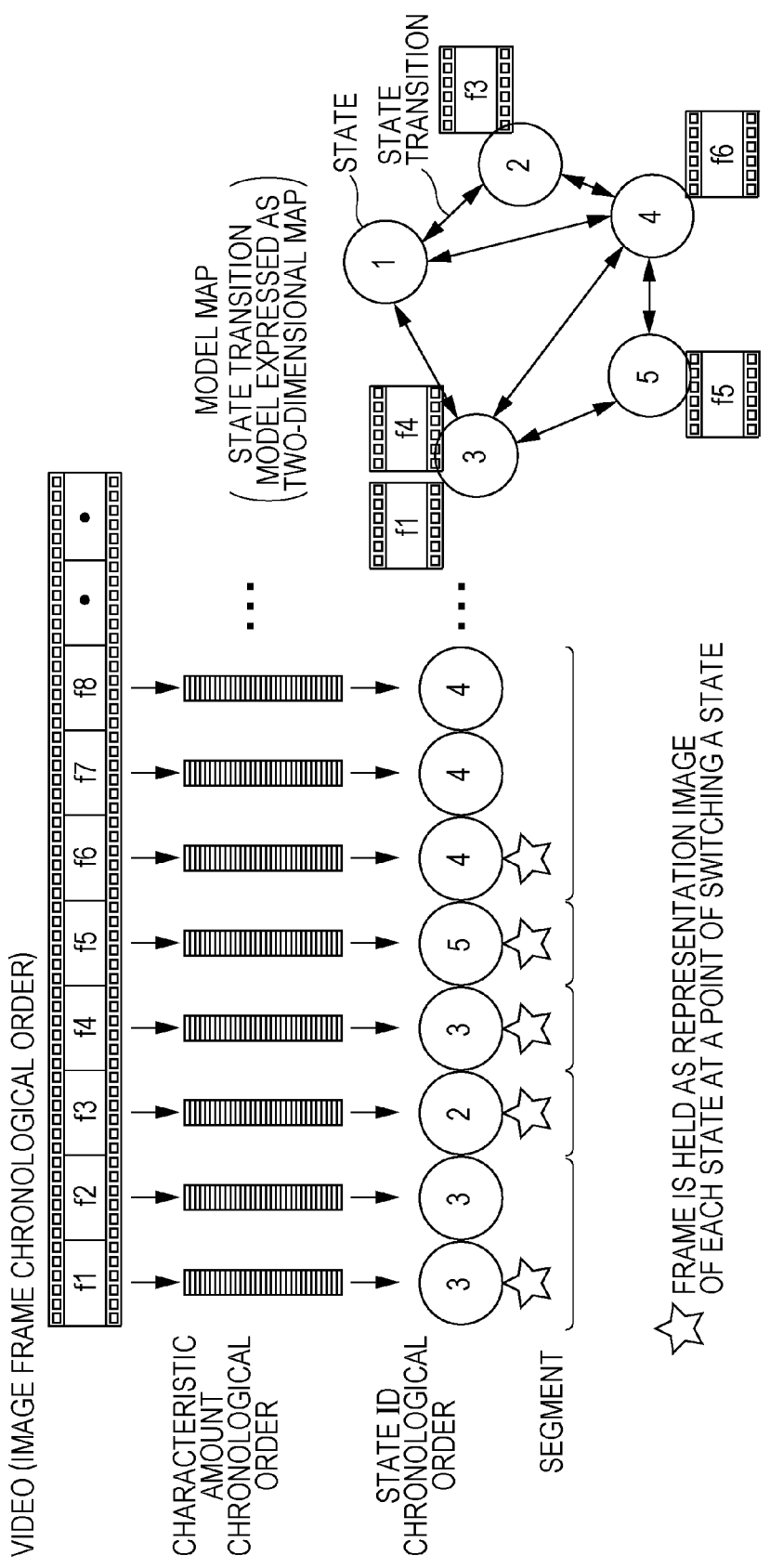
FIG. 9 is a diagram illustrating a summary of the segment map generating process of a segment map generating unit.

FIG. 9 is a diagram illustrating a summary of the process (segment map generating process) of the segment map generating unit 14 of FIG. 3.

In the clustering unit 21 in the segment map generating unit 14, characteristic amounts are extracted with regard to each frame f1, f2, . . . , of the reproduction target content stored in the content storage unit 11.

Then, in the clustering unit 21, using the characteristic amounts of each frame f1, f2, . . . , and the HMM as the clustering model, each frame f1, f2, . . . , is clustered and a series of state IDs which are indexes of the state of the HMM configuring the maximum likelihood state series in which the chronological order of the characteristic amounts of the frames f1, f2, . . . , is observed is supplied to the segment dividing unit 22 as cluster information representing the clusters to which each frame f1, f2, . . . , belongs.

In FIG. 9, frames f1 and f2 of the reproduction target content are clustered into a cluster corresponding to a state in which the state ID is 3, frame f3 is clustered into a cluster corresponding to a state in which the state ID is 2, frame f4 is clustered into a cluster corresponding to a state in which the state ID is 3, frame f5 is clustered into a cluster corresponding to a state in which the state ID is 5, frame f6, f7, f8, . . . , are clustered into a cluster corresponding to a state in which the state ID is 4, respectively.

The segment dividing unit 22 (FIG. 3) divides the frames belonging to each cluster into video segments which are collections of frames of one or more temporally continuous frames.

Therefore, in the segment dividing unit 22, in a case where focus was given in sequence from the beginning to the series of state IDs as cluster information from the clustering unit 21, when the state ID being focused on matches the immediately previous state ID, a frame corresponding to the state ID being focused on is included in the video segment including the frame corresponding to the immediately previous state ID.

Here, when the state ID being focused on does not match the immediately previous state ID, the part up to the frame corresponding to the immediately previous state ID is divided into one video segment and the part from the frame corresponding to the state ID being focused on is divided into a new video segment.

In FIG. 9, the continuous frames f1 and f2 belonging to the cluster corresponding to a state in which the state ID is 3, frame f3 belonging to a cluster corresponding to a state in which the state ID is 2, frame f4 belonging to a cluster corresponding to a state in which the state ID is 3, frame f5 belonging to a cluster corresponding to a state in which the state ID is 5, and the continuous frames f6, f7, f8 belonging to a cluster corresponding to a state in which the state ID is 4, are respectively divided into video segments.

The segment dividing unit 22 supplies the above video segments (frame information specifying the frame belonging to the video segment and cluster information representing clusters to which the (frame of the) video segment belongs as segment information) to the segment-representing image generating unit 23.

For example, as described above, the segment-representing image generating unit 23 (FIG. 3) generates a thumbnail in which the frame of the beginning of the video segment is compressed as a segment-representing image representing the video segment for the video segments from the segment dividing unit 22, and supplies these to the map generating unit 24.

Here, if the state ID is set to describe the state of value i as state #i, in FIG. 9, the thumbnail of the beginning frame f1 is generated as a segment-representing image for video segments having continuous frames f1 and f2 belonging to the cluster corresponding to state #3.

In addition, respectively, the thumbnail of frame f3 of the beginning is generated as a segment-representing image for the video segment having the frame f3 belonging to the cluster corresponding to state #2, with the same applying to the thumbnail of frame f4 of the beginning for the video segment having the frame f4 belonging to the cluster corresponding to state #3, the thumbnail of frame f5 of the beginning for the video segment having the frame f5 belonging to the cluster corresponding to state #5, and the thumbnail of frame f6 of the beginning for the video segment having the continuous frames f6, f7, f8, . . . belonging to the cluster corresponding to state #4.

In the map generating unit 24 (FIG. 3), for each cluster, a cluster representation image representing (the state corresponding to) the cluster is selected from the segment-representing images of the video segments belonging to the cluster.

In addition, in the map generating unit 24, the HMM as the model of interest is converted to a model map, and along with this, a segment map in which segment-representing images selected as the cluster representation images of the clusters corresponding to the states are arranged at positions of each states on the model map is generated.

Here, in the map generating unit 24, all the segment-representing images of the video segment belonging to the cluster corresponding to the state are associated with each state of the segment map.

In FIG. 9, respectively, the thumbnail of frame f1, which is a segment-representing image of the video segment having the continuous frames f1 and f2 belonging to the cluster corresponding to state #3, is associated with state #3, the thumbnail of frame f3, which is a segment-representing image of the video segment having the frame f3 belonging to the cluster corresponding to state #2, is associated with state #2, the thumbnail of frame f4, which is a segment-representing image of the video segment having the frame f4 belonging to the cluster corresponding to state #3, is associated with state #3, the thumbnail of frame f5, which is a segment-representing image of the video segment having the frame f5 belonging to the cluster corresponding to state #5, is associated with state #5, and the thumbnail of frame f6, which is a segment-representing image of the video segment having the continuous frames f6, f7, f8, . . . , belonging to the cluster corresponding to state #4, is associated with state #4.

Figure 10:
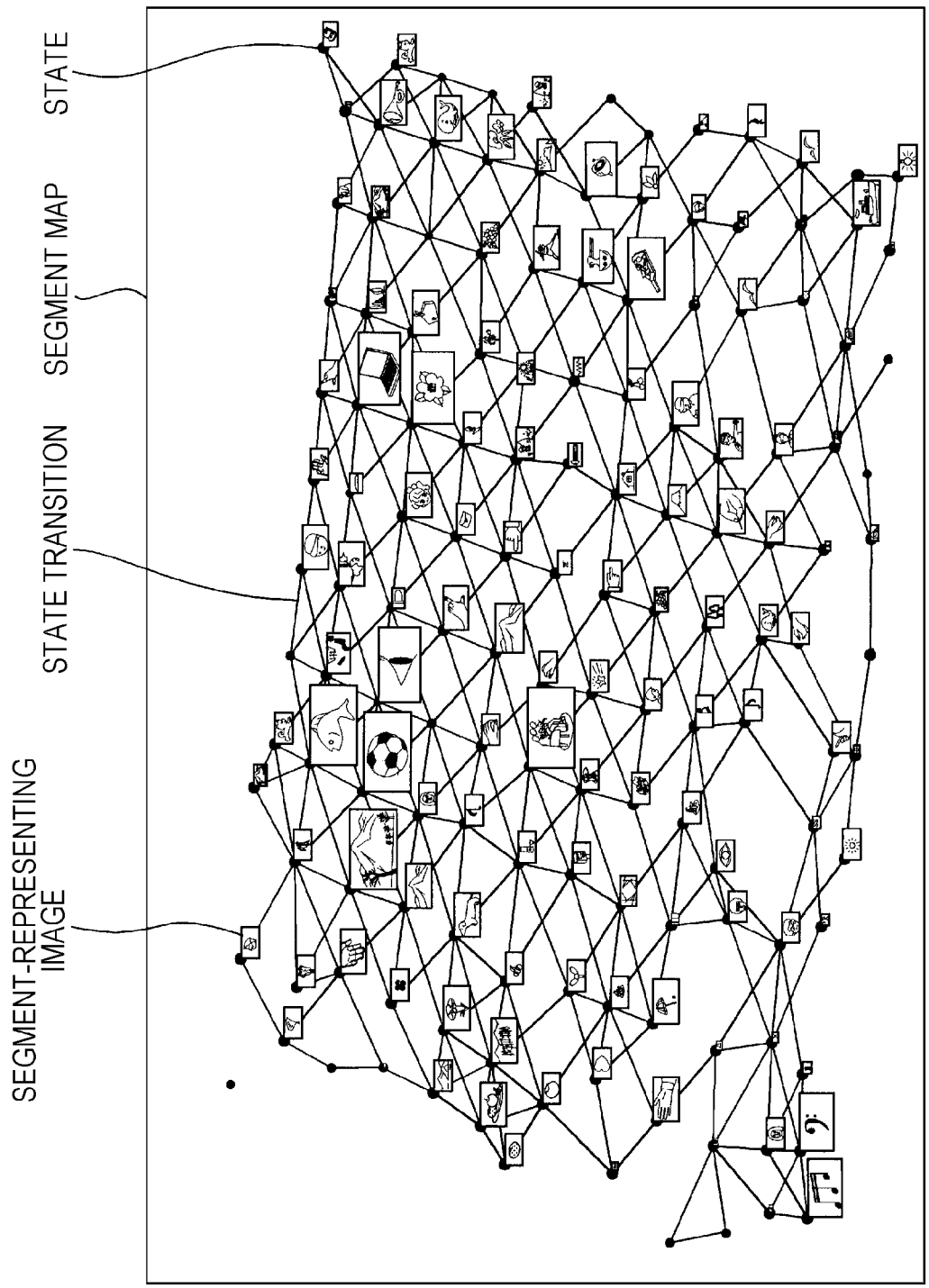
FIG. 10 is a diagram showing an example of a segment map generated by the segment map generating unit.

FIG. 10 is a diagram showing an example of a segment map generated by the segment map generating unit 14 (FIG. 3).

In the segment map, segment-representing images selected as cluster representation images of clusters corresponding to the states are arranged at the positions of each state on the model map of FIG. 8.

For example, HMM learning as a clustering model is performed by taking out news programs of a latest broadcast portion from among broadcast portion of two times or more of television broadcast programs (news programs) of news which is broadcast daily or weekly as content of a predetermined category and using news programs of a past broadcast portion as content for learning, and the news program of the latest broadcast portion is given to the segment map generating unit 14 as reproduction target content, whereby the segment map as shown in FIG. 10 is generated.

As mentioned above, the segment map is a map in which segment-representing images (selected as cluster representation images) are arranged on the model map (FIG. 8) and which is based, so to speak, on the model map.

The model map is a map in which the HMM after learning is projected on a two-dimensional surface using a multidimensional scaling method, and, according to the model map, the characteristics and the like of appearance are similar and the cluster group in which the scenes (frames) for which the temporal relationship before and after is close are clustered is expressed as a vicinity state group capable of transition in terms of two-dimensional expression.

Here, according to the segment map based on the model map in this manner, for example, the scene configuration of the program is expressed as a two-dimensional map in a form in which scenes (frames or video segments) in which the presenter of the news program appears as the reproduction target content are clustered and gathered in (clusters corresponding to) a certain state, and scene groups transitioning from such scenes, for example, of each scene of a sports section or a weather forecast for tomorrow are respectively clustered and gathered in another state.

Therefore, it may be said that the segment map is a map of the reproduction target content, that is, the scene, and functions as an effective tool for visualization to enable the user to look over the reproduction target content.

In addition, in FIG. 10, there is a state in which segment-representing images (selected as cluster representation images) are not arranged. The presence of a state in which segment-representing images are not arranged represents that there were no frames of the reproduction target content clustered in (clusters corresponding to) that state.

Here, the size of the segment-representing images arranged at each state of the segment map is able to be set to a different size for each state or is able to be set to a set size regardless of the state.

In a case where the size of the segment-representing images arranged in each state of the segment map set to a different size for each state, in the map drawing unit 64 (FIG. 7), for example, it is possible to determine the importance for each state and to arrange the segment-representing images on the segment map (model map) in sizes corresponding to this importance.

Figure 11:
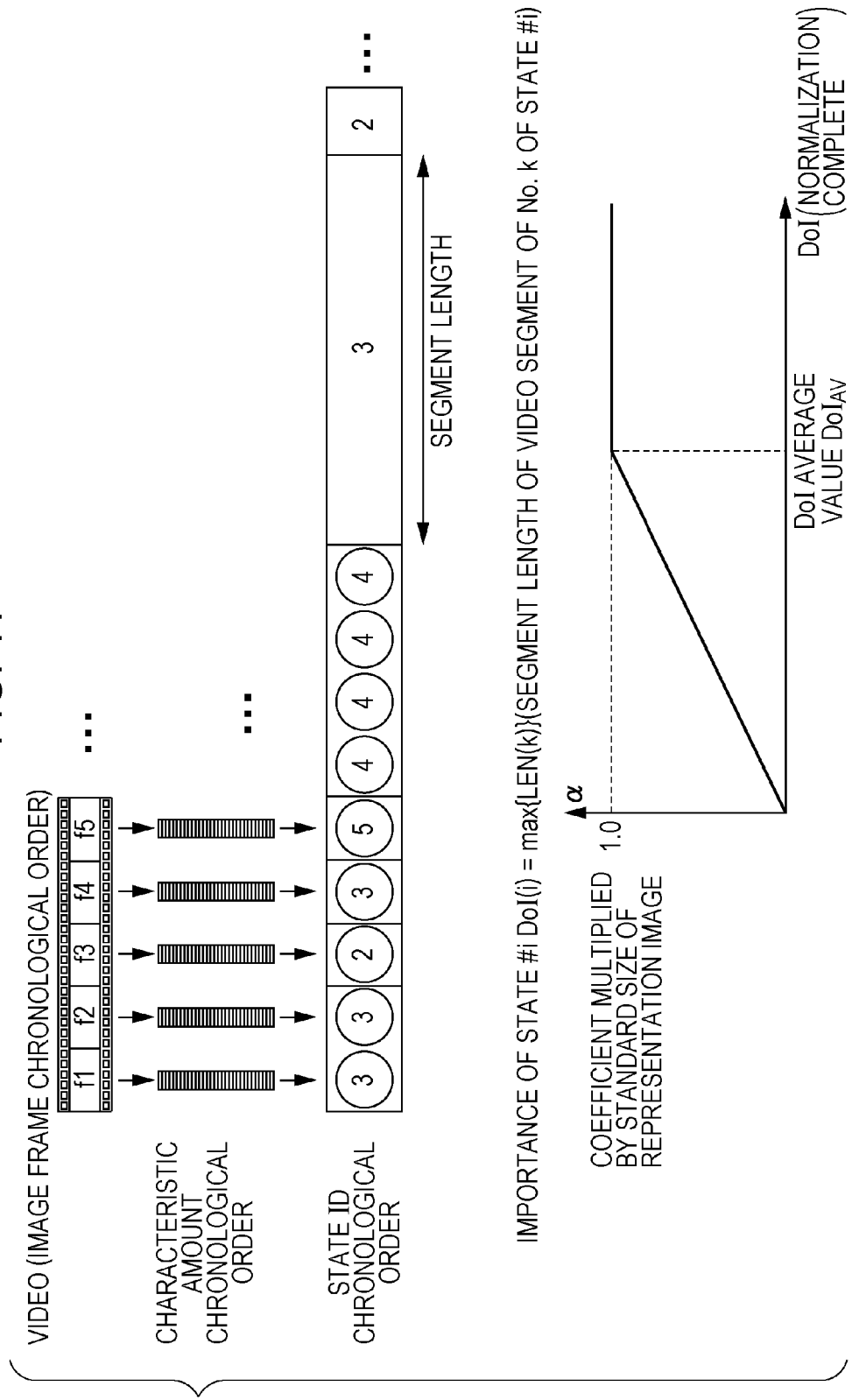
FIG. 11 is a diagram illustrating a method of determining the importance of a state.

FIG. 11 is a diagram illustrating a method of determining the importance of a state.

For each state of the model map (each state of the HMM as the clustering model), the map drawing unit 64 determines an index DoI (Degree of Importance), which represents to what extent the state is expressing an significant scene in the entirety of the reproduction target content, as the importance.

Here, when the importance of state $s_i$ is represented by DoI(i) and the segment length, which is the length (number of frames) of the k-th video segment among the video segments of the reproduction target content clustered in (clusters corresponding to) state $s_i$, is represented by LEN(k), the map generating unit 64 determines the importance DoI(i) of the state $s_i$ according to the formula DoI(i)=max{LEN(k)}.

In addition, when the number of video segments of the reproduction target content clustered in state $s_i$ is represented by K, max{LEN (k)} represents the maximum value in LEN (1), LEN(2), . . . , LEN(K), in other words, the maximum number of frames of the video segment of the reproduction target content clustered in state $s_i$.

When the importance DoI(i) of each state $s_i$ is determined, the map drawing unit 64 determines the average values $DoI_{AV}$=(DoI(1), DoI(2), . . . , DoI(N))/N, of the importances=(DoI(1), DoI(2), . . . , DoI(N) of all the states $s_1, s_2, \ldots, s_N$.

In addition, using the average value $DoI_{AV}$ of the importances, the map drawing unit 64 sets the importance DoI as a parameter and determines the coefficient function α=f(DoI), which is a coefficient determining the size coefficient α which is a coefficient for determining the size of the segment-representing images.

Here, for example, as shown in FIG. 11, in a range where the importance DoI, which is a parameter, is from 0 to the average value $DoI_{AV}$ of the importances, the coefficient function α=f(DoI) is increased in proportion to the importance DoI which is a parameter and becomes α=0 when the importance DoI which is a parameter is 0 and becomes a function in which α=1.0 when the importance DoI which is a parameter is $DoI_{AV}$, furthermore, in a range where the importance DoI which is a parameter exceeds the average value $DoI_{AV}$ of the importances, it is a function becoming a fixed value of α=1.0.

When the coefficient function α=f(DoI) is determined using the average value $DoI_{AV}$ of the importances, the map drawing unit 64 determines the size coefficient α=f(DoI(i)) for each state $s_i$ and multiplies the size coefficient α=f(DoI(i)) by the standard size which is a size of a segment-representing image set in advance, whereby the size of the segment-representing image arranged in the segment map is determined, and, with this size, segment-representing images (selected as cluster representation images) are arranged on the segment map.

As described above, by arranging the segment-representing images on the segment map with a size corresponding to the importance of the state, in the segment map, as shown in FIG. 10, the more the segment-representing images are clustered in a state where the importance is great, the bigger the size to be displayed.

Thus, by looking at the segment map, it is possible for the user to quickly identify video segments clustered in a state of great importance and significant scenes in the reproduction target content.

Figure 12:
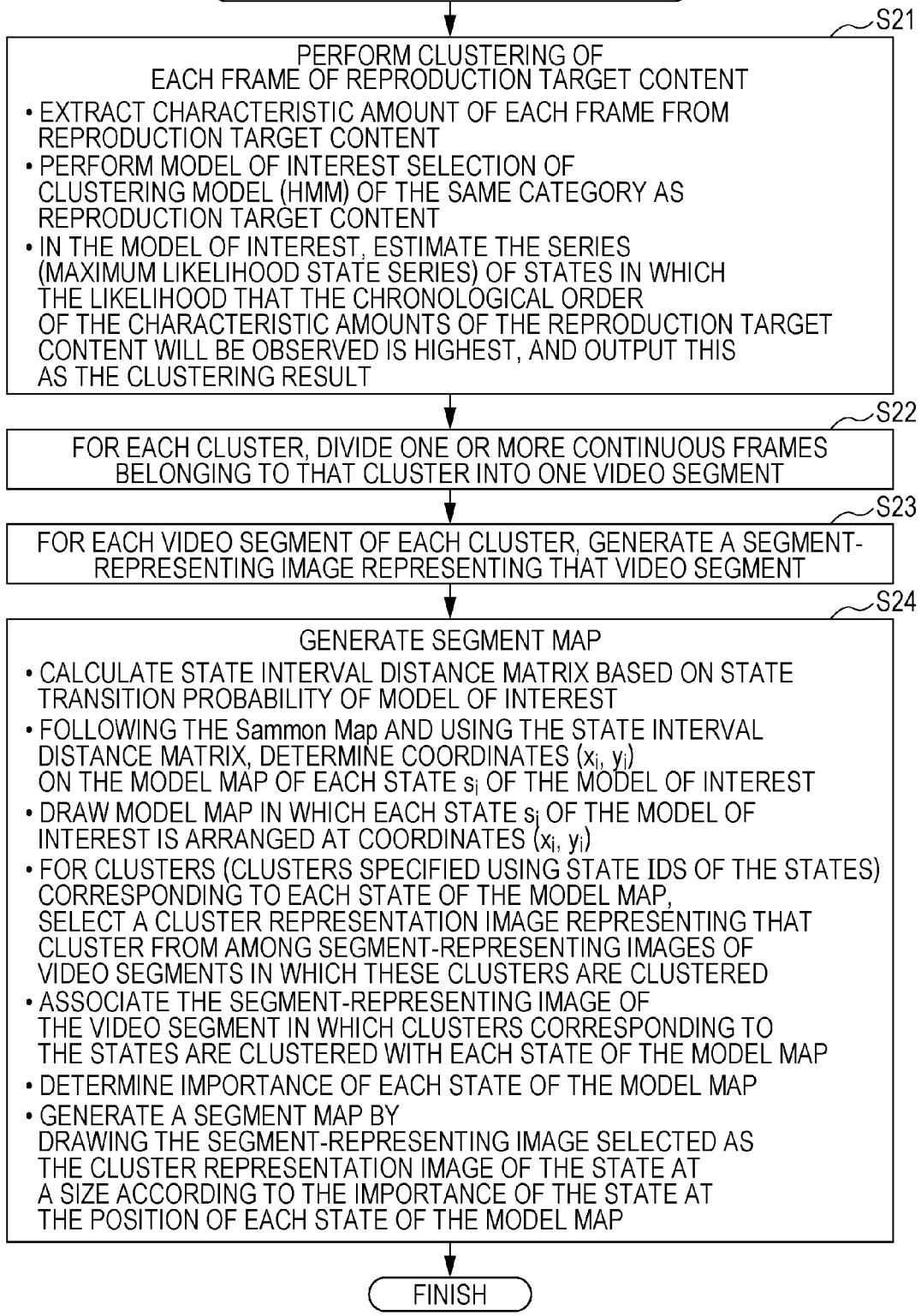
FIG. 12 is a flowchart illustrating a segment map generating process performed by the segment map generating unit.

FIG. 12 is a flowchart illustrating the segment map generating process performed in step S12 of FIG. 2 by the segment map generating unit 14 (FIG. 3).

In step S21, the clustering unit 21 (FIG. 3) clusters each frame of the reproduction target content and the process proceeds to step S22.

In other words, in the clustering unit 21, the cluster determining unit 33 (FIG. 4) extracts the characteristic amount of each frame of the reproduction target content.

In addition, the cluster determining unit 33 selects the HMM of the same category as the reproduction target content from among the HMMs as the clustering models stored in the clustering model storage unit 32 (FIG. 4), as the model of interest.

Here, in the HMM as the model of interest, the cluster determining unit 33 estimates the maximum likelihood state series in which the chronological order of the characteristic amounts is observed and supplies (a series of state IDs which are indexes of states of HMMs configuring) this maximum likelihood state series to the segment dividing unit 22 as cluster information representing the clustering result of each frame of the reproduction target content.

In step S22, based on the cluster information from (the clustering determining unit 33 of) the clustering unit 21, the segment dividing unit 22 (FIG. 3) divides the frames belonging to each cluster into video segments which are collections of frames of one or more temporally continuous frames.

Here, for each video segment of the reproduction target content, the segment dividing unit 22 supplies the segment information representing the video segment to the segment-representing image generating unit 23 and the process proceeds from step S22 to step S23.

In step S23, for each video segment of the reproduction target content, the segment-representing image generating unit 23 (FIG. 3) generates a segment-representing image representing the video segment using the frames configuring the video segment identified based on the segment information from the segment dividing unit 22.

Here, the segment-representing image generating unit 23 supplies the segment-representing image of each video segment to the map generating unit 24 and the process proceeds from step S23 to step S24.

In step S24, the map generating unit 24 (FIG. 3) uses the segment-representing images from the segment-representing image generating unit 23, generates a segment map, and supplies this to the display control unit 16, thereby finishing the segment map generating process.

In other words, in the map generating unit 24, the state interval distance calculating unit 62 (FIG. 7) determines the state interval distance $d_{ij}$* from one state $s_i$ of the HMM as the model of interest to another state $s_j$ based on the state transition probability $a_{ij}$, calculates a state interval distance matrix which is a matrix of N rows and N columns in which the state interval distance $d_{ij}*$ is set as a component, and supplies this to the coordinate calculating unit 63.

The coordinate calculating unit 63 (FIG. 7) uses the state interval distance matrix from the state interval distance calculating unit 62 while following a multidimensional scaling method such as the Sammon Map, determines the coordinates $Y_i=(x_i, y_i)$ on the model map of each state $s_i$ of the HMM as the model of interest so that the error function E of the above-described formula (1) is minimized for example, and supplies this to the map drawing unit 64.

The map drawing unit 64 (FIG. 7) arranges (the images of) the corresponding state $s_i$ at the position of the coordinates $Y_i$ from the coordinate calculating unit 63 and draws a line segment linking between the states according to the state transition probability between these states, whereby the HMM as the model of interest is converted to a two-dimensional model map (graphic).

In addition, in the map generating unit 24, for each cluster (corresponding to each state of the HMM as the model of interest), the cluster representation image selecting unit 61 (FIG. 7) selects a cluster representation image representing the cluster from the segment-representing images of the video segments belonging to the cluster.

Here, the cluster representation image selecting unit 61 supplies a segment-representing image belonging to each cluster to the map drawing unit 64 along with a flag representing the segment-representing image selected as the cluster representation image.

For each state of the model map (segment map), the map drawing unit 64 (FIG. 7) extracts the segment-representing images belonging to the clusters corresponding to those states from the segment-representing image from the cluster representation image selecting unit 61 and creates and association with the state (corresponding to the cluster) to which the segment-representing images belong.

In addition, the map drawing unit 64, for example, determines the importance DoI of each state of the model map as described in FIG. 11.

Here, at the position of the state $s_i$ on the model map, the map drawing unit 64 draws the segment-representing image selected as the cluster representation image of the cluster corresponding to the state $s_i$ from among the segment-representing images associated with the state $s_i$ for each state $s_i$ on the model map, whereby a segment map is generated.

Here, when drawing the segment-representing images selected as the cluster representation image of the cluster corresponding to the state $s_i$, the map generating unit 64 draws the segment-representing images with a size corresponding to the importance DoI(i) of the state $s_i$.

The segment map obtained by the above segment map generating process is supplied to the display control unit 16 (FIG. 1) from the segment map generating unit 14.

Then, in the display control unit 16, the segment map is displayed on the display unit 17.

After the segment is displayed on the display unit 17, in the display control unit 16, as described in step S14 of FIG. 2, display control of the segment map is performed according to the operation (operation event generated by the operation event processing unit 12 (FIG. 1)) of the user.

[Display Control of Segment Map or the Like Using Display Control Unit 16]

As the display mode (internal state of the display control unit 16 at the time of display of the segment map) when the display control unit 16 performs display control of the display of the segment map, there are three modes of a layer 0 mode, a layer 1 mode and a layer 2 mode.

When the segment map is supplied from the segment map generating unit 14, the display control unit 16 sets the display mode to the layer 0 mode and displays (allows display of) the segment map on the display unit 17.

In the layer 0 mode, in the display unit 17, the segment map is displayed as shown in FIG. 10, for example.

Figure 13:
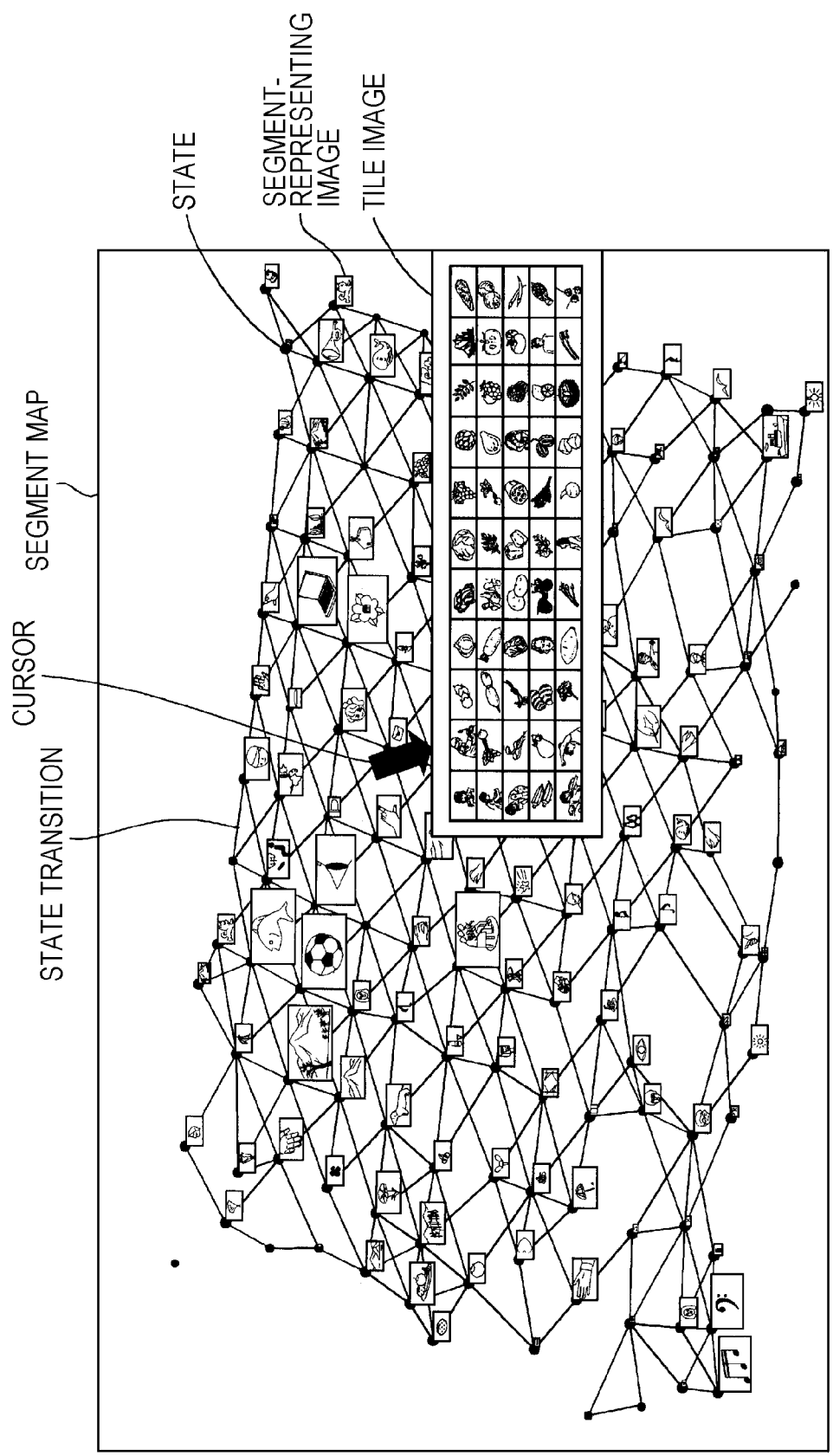
FIG. 13 is a diagram showing a display example of a segment map on which a tile image is superimposed.

FIG. 13 is a diagram showing a display example of a segment map when the user instructs the position on the display screen of the display unit 17 in the layer 0 mode.

Here, below, in order to facilitate understanding of the description, for example, a mouse is adopted as operation device for the user to perform an operation and, in the operation event processing unit 12 (FIG. 1), operation events such as a (single) click of the mouse, a double click, or movement of the (mouse) cursor are set to be generated.

In addition, the operation events may be set to include information of the position of the cursor.

Here, as the operation device for the user to perform an operation, it is possible to adopt a touch panel, or another pointing device as well as the mouse. In a case where a touch panel is adopted as the operation device, tapping and double tapping the touch panel, for example, may be made to correspond to clicking and double clicking of the mouse respectively.

In addition, the movement of the cursor with the mouse, for example, is able to be made to correspond to moving of a finger in a state where the finger or the like is touching the touch panel. In addition, in a case where it is possible for the touch panel to detect the proximity of a finger or the like, the movement of the cursor with the mouse is able to be made to correspond to the moving of the finger close to the touch panel, for example.

In the layer 0 mode, the display control unit 16 sets the position of the cursor moved in accordance with the operation of the mouse to an instructed position instructed by the user, sets the state on the segment map which is closest to the instructed position as the state of interest to be focused on, and displays a tile image, which is an image of a list of segment-representing images associated with (clusters corresponding to) the states of interest, on the display unit 17 in a form superimposed with the segment map.

FIG. 13 is a diagram showing a display example of a segment map on which a tile image is superimposed.

In the layer 0 mode, the display control unit 16 sets the state on the segment map which is closest to the instructed position of the user as the state of interest to be focused on, and, in a case where the distance between the position of the state of interest and the instructed position is a threshold or less, generates a tile image which is an image of a list of segment-representing images associated with the state of interest and displays this so as to be superimposed on the segment map.

Here, in the tile image, the segment-representing images associated with the states of interest are arranged so as to line up in tile form (grid shape) in chronological order in the directions from left to right and from top to bottom, for example.

Figure 14:
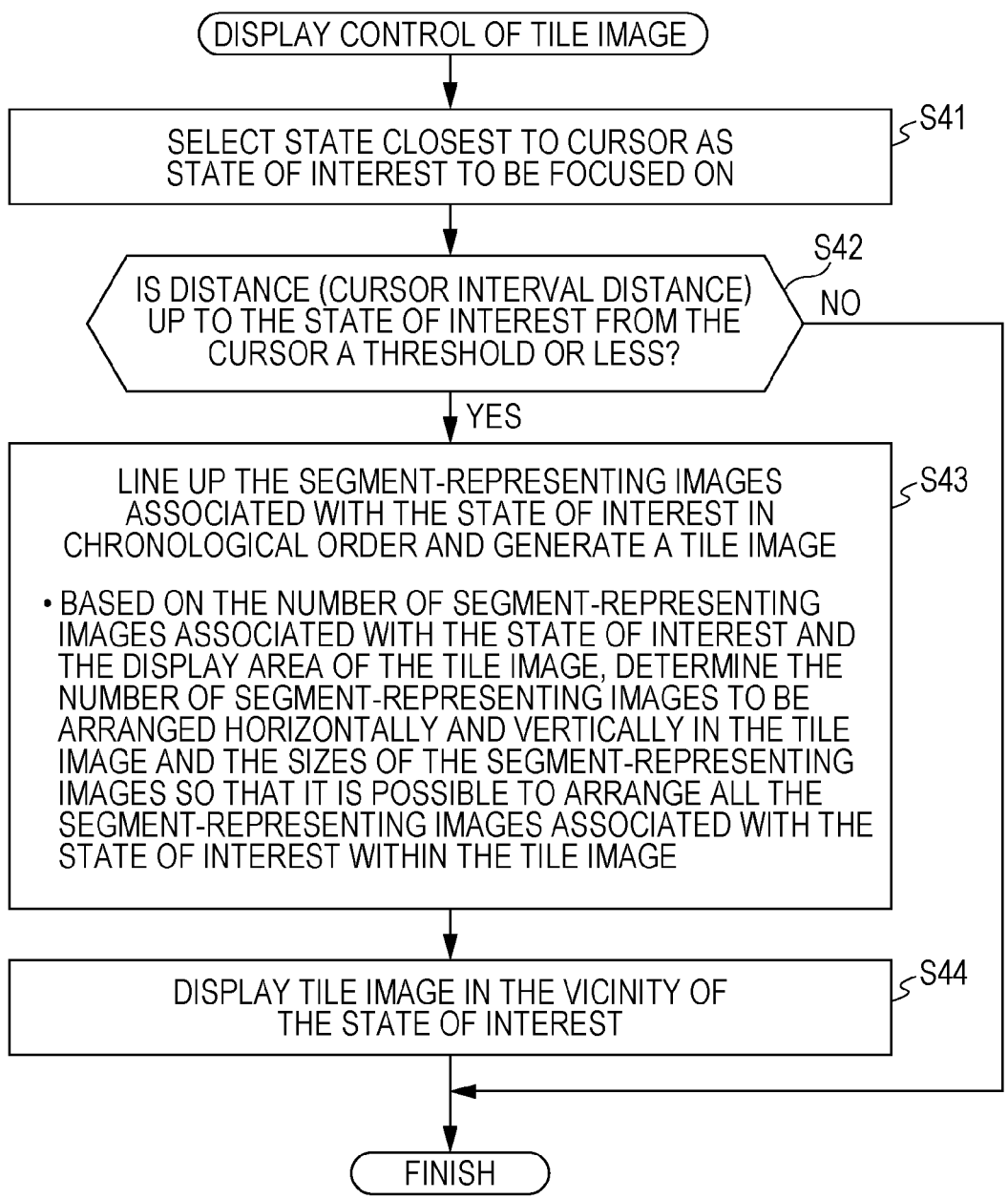
FIG. 14 is a flowchart illustrating a display control process of a display control unit when the tile image is displayed.

FIG. 14 is a flowchart illustrating a display control process of the display control unit 16 when the tile image is displayed as described above.

The process of FIG. 14, for example, is started at an irregular timing such as when the cursor is moved, or at a periodic timing.

In step S41, the display control unit 16 selects the state closest to the position of the cursor which is the instructed position of the user from among the states of the segment map as the state of interest and the process proceeds to step S42.

In step S42, the display control unit 16 determines whether or not the distance (below referred to as the cursor interval distance) up to the position of the state of interest from the position of the cursor which is the instructed position of the user is a threshold or less.

In step S42, in a case where the cursor interval distance is determined not to be the threshold or less, that is, in a case where, for example, the cursor is at a position separated from any of the states of the segment map at the end portions or the like of the display screen of the display unit 17, the display unit 16 skips step S43 and S44 and the process is finished.

In addition, in a case where the cursor interval distance is not the threshold or less, when the tile image is being displayed on the display unit 17, the display control unit 16 erases the tile image.

On the other hand, in step S42, in a case where it is determined that the cursor interval distance is the threshold or less, the process proceeds to step S43, the display control unit 16 generates a tile image which is an image of a list in which the segment-representing images associated with the state of interest are lined up in chronological order, and the process proceeds to step S44.

Here, the display control unit 43 sets the size of the display area displaying the tile image according to the number of segment-representing images associated with the state of interest.

That is, regarding the size of the display area displaying the tile image, the display control unit 43 sets the size of the display area displaying the tile image such that, within a range from a minimum size to a maximum size determined in advance, the size is increased as the number of segment-representing images associated with the state of interest increases.

Below, the size of the display area set according to the number of segment-representing images associated with the state of interest is also referred to as the set size.

The display control unit 43 determines the number of segment-representing images respectively arranged horizontally and vertically in the tile image and the size of the segment-representing images arranged in the tile image such that it is possible to arrange all the segment-representing images associated with the state of interest within the tile image displayed in the display area of a set size.

Here, the maximum value $NUM_{max}$ (and the minimum value of the size of the segment-representing images) of the number of segment-representing images which are able to be arranged within the tile image displayed in the largest display area is determined in advance, and, in a case where the number of segment-representing images associated with the state of interest exceeds the maximum value $NUM_{max}$, the number of segment-representing images arranged in the tile image is limited to the maximum value $NUM_{max}$. That is, among the segment-representing images associated with the state of interest, for example, segment-representing images of a number equal to the maximum value $NUM_{max}$ are arranged in the tile image in chronological order.

In step S44, the display control unit 14 displays the tile image, in which the segment-representing images associated with the state of interest are lined up, in a form superimposed in the vicinity of the state of interest of the segment map and finishes the process.

In addition, in a case where the cursor interval distance is the threshold or less, when the tile image (tile image in which the segment-representing images associated with the state of interest are lined up) of the state of interest is already displayed on the display unit 17, the display control unit 16 skips step S43 and S44 and maintains the display of the tile image already being displayed as it is.

In addition, in a case where the cursor interval distance is the threshold or less, when a tile image of states other than the state of interest is displayed on the display unit 17, the display control unit 16 erases the tile image.

As described above, in the layer 0 mode, since the tile image, which is an image of a list of segment-representing images associated with the states (states of interest) on the segment map closest to the instructed position of the user, is displayed, it is possible for the user to confirm the list of segment-representing image associated with the desired state simply by moving the cursor close to the position of the desired state and furthermore to grasp the scenes clustered at (the clusters corresponding to) the desired state.

Here, in the case described above, the tile image, which is an image of a list of segment-representing images associated with the states (states of interest) on the segment map closest to the instructed position of the user, is set to be displayed; however, instead of displaying the tile image, it is possible to perform highlighted display of the segment-representing images (selected as the cluster representation images) displayed at the position of the state of interest.

As the method of performing the highlighted display of the segment-representing images, for example, it is possible to adopt a method of increasing the size of the segment-representing images or a method of displaying a red frame surrounding the periphery of the segment-representing images.

In addition, which of any of among the display of the tile image and the highlighted display of the segment-representing images displayed at the position of the state of interest is performed is able to be set according to the operation of the user.

In the following, display of the tile image is set to be performed.

In the layer 0 mode, when the tile image is displayed, if the user performs a (single) click of a mouse for example, as a predetermined operation determined in advance, the display control unit 16 moves (changes) (sets) the display mode from the layer 0 mode to the layer 1 mode.

In the layer 1 mode, the display control unit 16 fixes (locks) the display of the tile image.

In other words, in the layer 0 mode, when the user causes the cursor to move, since the tile image, in which the segment-representing images associated with the state closest to the cursor after movement are arranged in chronological order, is displayed, if the state closest to the cursor is changed due to the movement of the cursor, the tile image is also changed.

In such a layer 0 mode in which the tile image is displayed, if a click is performed when the tile image is displayed, the display control unit 16 moves the display mode from the layer 0 mode to the layer 1 mode and fixes the display of the tile image so that the display of the tile image displayed at that time is maintained.

Here, in the layer 1 mode, the tile image in which the display is fixed is also referred to as a fixed tile image.

Figure 15:
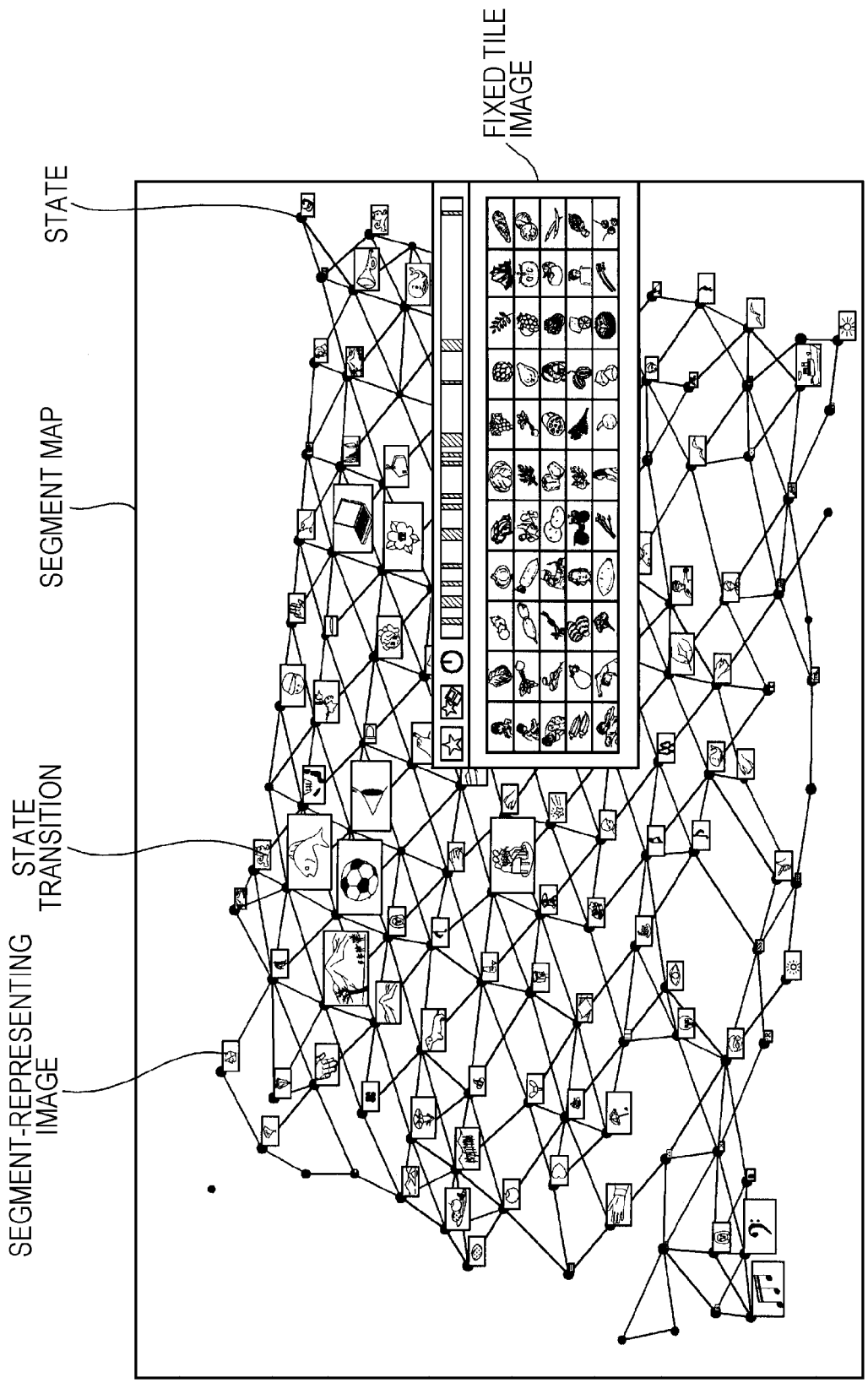
FIG. 15 is a diagram showing a display example of a fixed tile image.

FIG. 15 is a diagram showing a display example of a fixed tile image.

The fixed tile image is an image including the tile image displayed immediately before the click was performed in the layer 0 mode, that is, a tile image in which segment-representing images associated with the state of interest which is the state of the position closest to the position of the cursor at the time the click is performed in the layer 0 mode are arranged, and, in the layer 1 mode, after the fixed tile image is displayed, even if the cursor is moved (even if the instructed position of the user is changed), the display of the fixed tile image is maintained as it is.

Figure 16:
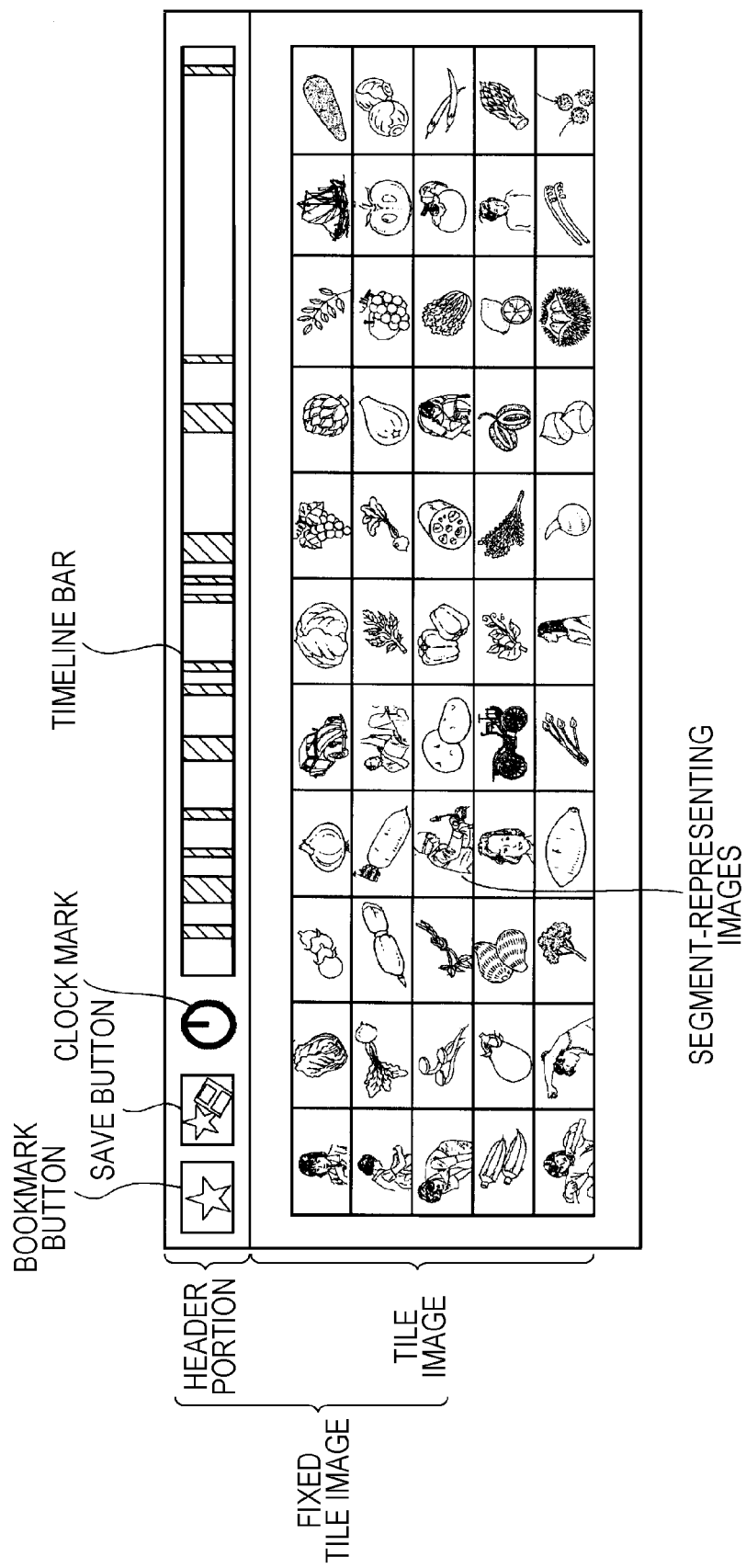
FIG. 16 is a diagram showing details of the fixed tile image.

FIG. 16 is a diagram showing details of the fixed tile image.

In the fixed tile image, the tile image displayed immediately before the click was performed in the layer 0 mode is arranged in the lower portion, and a header portion is arranged in the upper portion thereof.

A bookmark button, a save button, a clock mark, and a timeline bar are arranged in the header portion.

The bookmark button is operated (for example, clicked) when provisionally registering a state of interest, that is, a state, with which the segment-representing images arranged in the tile image of the lower portion of the fixed tile image are associated, as a favorite state in which the favorite scenes of the user are clustered.

When the bookmark button is operated, the state of interest is provisionally registered as a favorite state and when the bookmark button is pressed again, the provisional registration of the state of interest is canceled.

The save button is operated when actual registration of the provisional registration of the favorite state is performed.

When the save button is operated, if the state of interest is provisionally registered as a favorite state, the state of interest is actually registered as a favorite state. Further, for example, in a case where the state of interest is already actually registered as a favorite state, when the save button is operated, the actual registration of the state of interest is cancelled.

Here, as described above, since, when the save button is operated, if the state of interest is provisionally registered as a favorite state, the state of interest is actually registered as a favorite state, the operation of the save button in a case where the state of interest is provisionally registered as a favorite state is an operation requesting actual registration of the state of interest and will be referred to below as a favoriting operation.

In the actual registration performed according to the favoriting operation, in the operation event processing unit 12 (FIG. 1), an association is made with a user ID identifying the user, and a model ID identifying the HMM as the model of interest used in the generation of the model map which is the base of the segment map of the reproduction target content and a set ID identifying the state (cluster) to be actually registered as the favorite state are stored in the favorite information storage unit 13 as favorite information.

In addition, the user ID is set to be input by the user when the user uses the image processing apparatus of FIG. 1.

In addition, in the clustering model learning unit 31, after learning, a model ID for identifying the HMM is set to be assigned to the HMM as a clustering model.

The clock mark, for example, is an icon in which the reproduction time from the beginning to the end of the reproduction target content is assigned to a period of one cycle (one hour from 0 minutes to 60 minutes) of the hands of a clock and which displays a time representing the timing of the reproduction, in the reproduction target content, of the video segment corresponding to the representative image of interest to be focused on from among the segment-representing images (segment-representing images associated with the state of interest) arranged in the tile image.

In FIG. 16, since there is no representative image of interest (no selection is made), the clock mark displays zero minutes representing the timing of the beginning of the reproduction target content.

The timeline bar is a horizontal bar which assigns the reproduction time from the beginning to the end of the reproduction target content to from the left end of the timeline bar to the right end and represents the time (position) equivalent to the timing of the reproduction, in the reproduction target content, of the video segments respectively corresponding to the segment-representing images arranged in the tile image.

In the timeline bar of FIG. 16, the portions marked with diagonal lines represent the times equivalent the timing of the reproduction, in the reproduction target content, of the video segments respectively corresponding to the segment-representing images arranged in the tile image.

In the layer 1 mode, the display control unit 16 sets the position of the cursor moving along with the operation of the mouse as the instructed position instructed by the user, sets the segment-representing images closest to the instructed position (position of the cursor) among the segment-representing images (segment-representing images associated with the state of interest) arranged in (the tile image of) the fixed tile image as representative images of interest to be focused on, and highlights and displays these representative images of interest.

Figure 17:
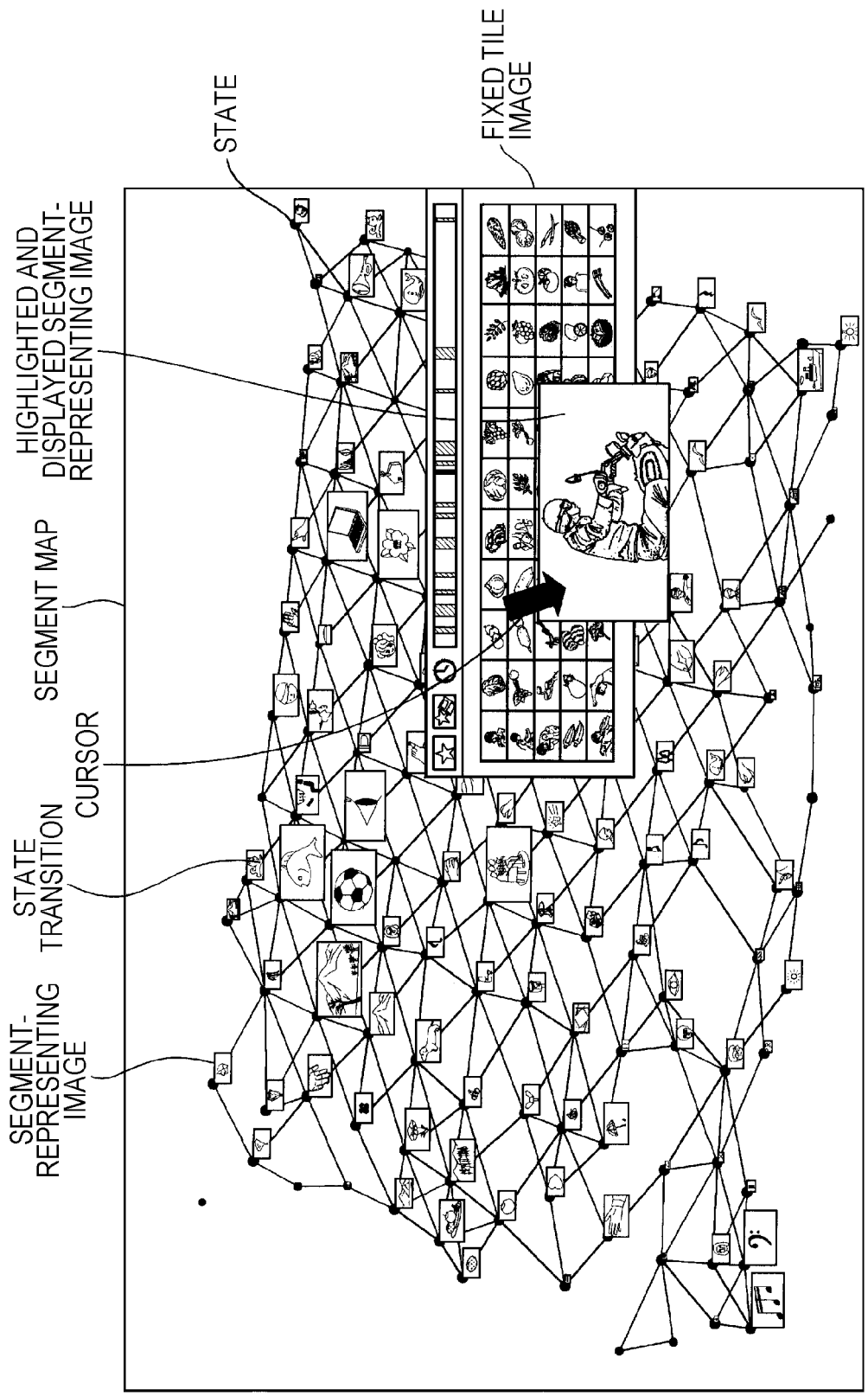
FIG. 17 is a diagram showing a display example of a highlighted display of a representative image of interest.

FIG. 17 is a diagram showing a display example of a highlighted display of a representative image of interest.

In the layer 1 mode, the display control unit 16 selects the segment-representing images closest to the instructed position of the user as representative images of interest from among the segment-representing images arranged in the fixed tile image and highlights and displays these representative images of interest separately from the fixed tile image.

In the highlighted display of the representative image of interest, for example, it is possible to display the representative image of interest at a large size of two times the size or the like of the size arranged in the fixed tile image or to display the representative image of interest surrounded by a red frame.

In FIG. 17, the highlighted display is performed by performing the display at a size greater than the size arranged in the fixed tile image.

In addition, in the layer 1 mode, the display control unit 16, for example, selects the segment-representing image closest to the instructed position as a representative image of interest only in a case where the instructed position of the user is on the fixed tile image.

Accordingly, in a case where the instructed position (cursor) of the user is not on the fixed tile image, none of the segment-representing images arranged in the fixed tile image are selected as a representative image of interest.

In addition, in FIG. 17, the segment-representing image closest to the instructed position of the user among the segment-representing images arranged in the fixed tile image is selected as the representative image of interest, accordingly, the clock mark displays a time representing the timing of the reproduction, in the reproduction target content, of the video segment corresponding to the representative image of interest.

In addition, in FIG. 17, in order for the user to be able to identify the timing of the reproduction, in the reproduction target content, of the video segment corresponding to the representative image of interest, in the timeline bar, a portion (black portion) equivalent to the timing of the reproduction, in the reproduction target content, of the video segment corresponding to the representative image of interest is displayed as different to the other portions.

In the layer 1 mode, when a representative image of interest is selected, if the user performs a (single) click of a mouse for example, as a predetermined operation determined in advance, the display control unit 16 moves the display mode from the layer 1 mode to the layer 2 mode.

In the layer 2 mode, the display control unit 16 displays a timeline image instead of the fixed tile image or superimposed on the fixed tile image.

In other words, in layer 1 mode, when the user moves the cursor on the fixed tile image, the segment-representing image closest to the cursor after movement is selected as the representative image of interest and the image of interest is highlighted and displayed; however, if clicking is performed when the representative image of interest is selected, the display control unit 16 moves the display mode from the layer 1 mode to the layer 2 mode, generates a timeline image, in which the representative image of interest and a predetermined number of segment-representing images continuing before and after the representative image of interest from among the segment-representing images (segment-representing images associated with the state of interest) arranged in the fixed tile image are arranged in chronological order with the image of interest as the center, and displays this on the display unit 17.

Figure 18:
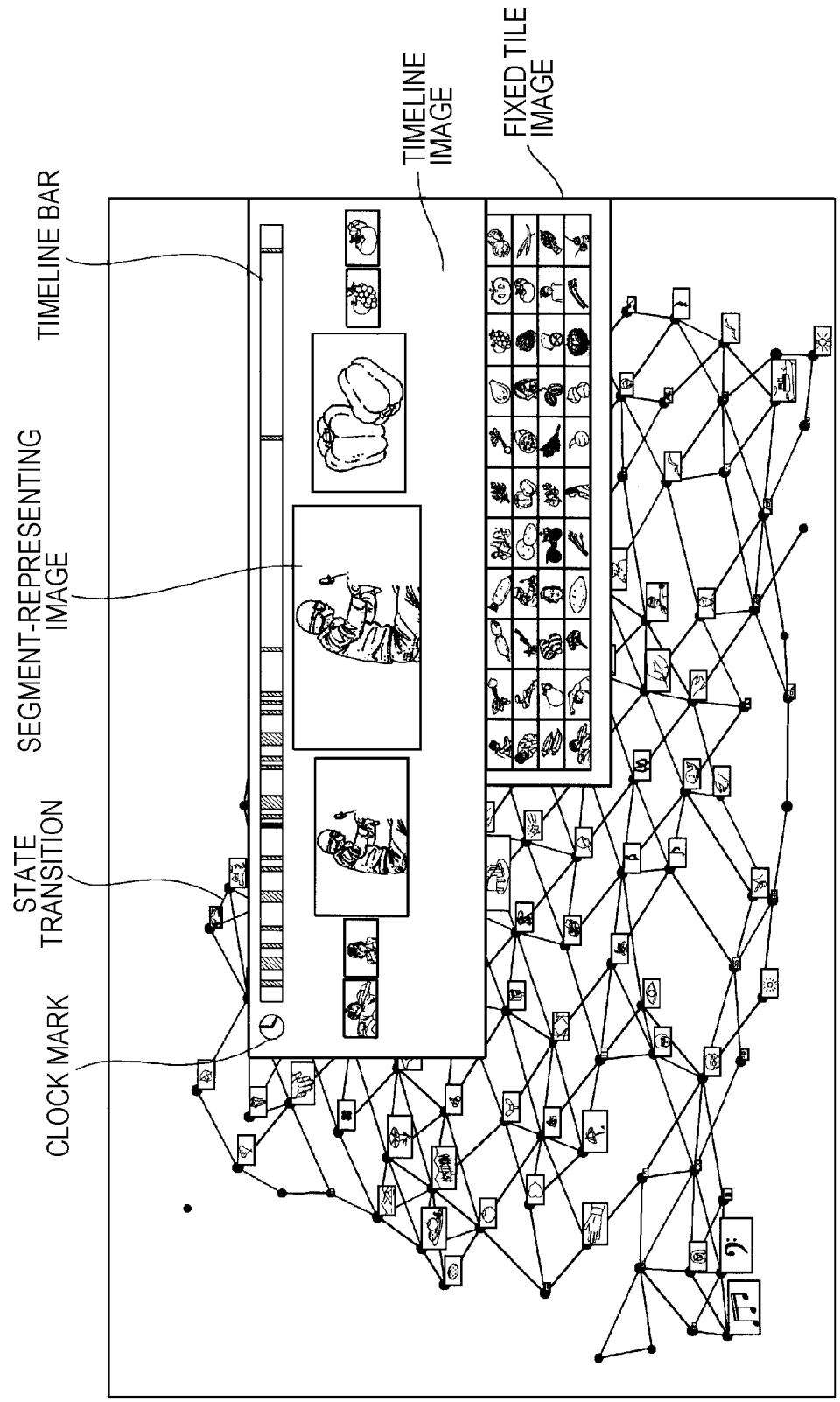
FIG. 18 is a diagram showing a display example of a timeline image.

FIG. 18 is a diagram showing a display example of a timeline image.

In the layer 1 mode, if clicking is performed when any one of the segment-representing images among the segment-representing images (segment-representing image associated with the state of interest) arranged in the fixed tile image is selected as the representative image of interest, the display control unit 16 moves the display mode from the layer 1 mode to the layer 2 mode, and selects a representative image of interest and a predetermined number of segment-representing images continuing before and after the representative image of interest from among the segment-representing images arranged in the fixed tile image as a configuration image configuring the timeline image.

Here, the display control unit 16 generates a timeline image in which the configuration images are arranged to be lined up in chronological order from left to right, for example, and displays this on the display unit 17.

In FIG. 18, a total of 7 segment-representing images of the representative image of interest, three segment-representing images (back in time) continuing in time before the representative image of interest and three segment-representing images (forward in time) continuing in time after the representative image of interest are selected as the configuration image.

Here, the timeline image is configured by arranging the 7 configuration images so as to be lined up from left to right in chronological order.

As described above, in the timeline image, since a total of 7 segment-representing images of the representative image of interest and 3 segment-representing images continuing before and after the representative image of interest respectively among the segment-representing images arranged in the fixed tile image are arranged in chronological order as the configuration image, the representative image of interest is arranged at the central portion of the timeline image.

In the timeline image, it is possible to arrange all of the 7 segment-representing images at the same size as the configuration image and it is possible to perform the arrangement such that the size is smaller for a configuration image of a position separated from the representative image of interest arranged in the central portion.

In the timeline image of FIG. 18, the arrangement is performed such that the size is smaller for a configuration image of a position separated from the representative image of interest arranged in the central portion.

In addition, in the timeline image, as shown in FIG. 18, in the upper portion thereof, it is possible to arrange a clock mark and a timeline bar in the same manner as arranged in the header portion of the fixed tile image (FIG. 16).

Here, in FIG. 18, 7 segment-representing images in chronological order with the representative image of interest in the center are adopted as the configuration images of the timeline image from among the segment-representing images (segment-representing images associated with the state of interest) arranged in the fixed tile image; however, the configuration images of the timeline image are not limited to 7.

Figure 19:
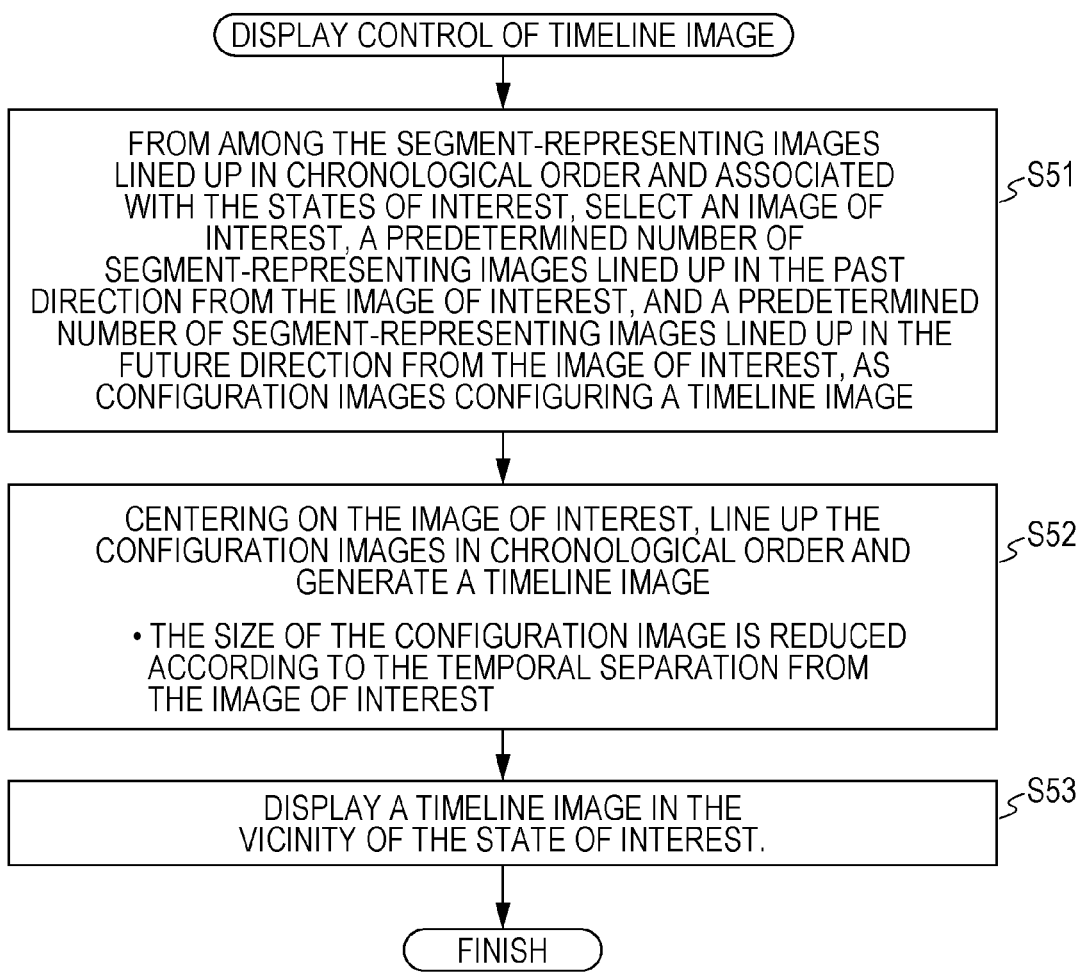
FIG. 19 is a flowchart illustrating a display control process of a display control unit when the timeline image is displayed.

FIG. 19 is a flowchart illustrating a display control process of the display control unit 16 when the timeline image is displayed.

In the layer 1 mode, if clicking is performed as a predetermined operation when any one of the segment-representing images among the segment-representing images (segment-representing image associated with the state of interest) arranged in the fixed tile image is selected as the representative image of interest, the display mode moves from the layer 1 mode to the layer 2 mode, and the process of FIG. 19 is started.

In step S51, the representative image of interest, and a predetermined number of segment-representing images continuing before and after the representative image of interest (a predetermined number of segment-representing images lined up to the side of the past and a predetermined number of segment-representing images lined up to the side of the future) are selected by the display control unit 16 from among segment-representing images (segment-representing images associated with the state of interest) arranged in the fixed tile image as configuration images configuring the timeline image, and the process proceeds to step S52.

In step S52, the display control unit 16 generates a timeline image in which the configuration images are arranged to be lined up in chronological order from left to right, and the process proceeds to step S53.

Here, the timeline image in which the configuration images are arranged to be lined up in chronological order from left to right becomes an image in which, in the configuration images, with the representative image of interest set as the center, segment-representing images as the configuration images of the side of the past (of the video segment) in relation to the representative image of interest are arranged on the left side in chronological order and the segment-representing images as the configuration images of the side of the future in relation to the representative image of interest are arranged on the right side in chronological order.

In addition, when the configuration images are arranged, the display control unit 16 performs the arrangement such that the size is smaller for a configuration image of a position separated from the representative image of interest arranged in the central portion.

In step S53, the display control unit 16 displays the timeline image in the vicinity of the state of interest of the segment map and finishes the process.

As described above, in the layer 2 mode, the timeline image is displayed as shown in FIG. 18.

Here, regarding the timeline image, as well as selecting the representative image of interest and a predetermined number of segment-representing images continuing before and after the representative image of interest as configuration images from among segment-representing images arranged in the fixed tile image, that is, the segment-representing images associated with the state of interest, for example, it is possible to select the representative image of interest and a predetermined number of respective segment-representing images (not limited to segment-representing images associated with the state of interest) of video segments continuing before and after video segments corresponding to the representative image of interest as configuration images from among all the segment-representing images of video segments configuring the reproduction target content.

Below, the configuration images of the timeline image are set to be selected from among the segment-representing image associated with the state of interest.

The segment-representing images as the configuration images arranged in the timeline image displayed by the display control unit 16 in the layer 2 mode are able to be scrolled according to the operation of the user.

Figure 20:
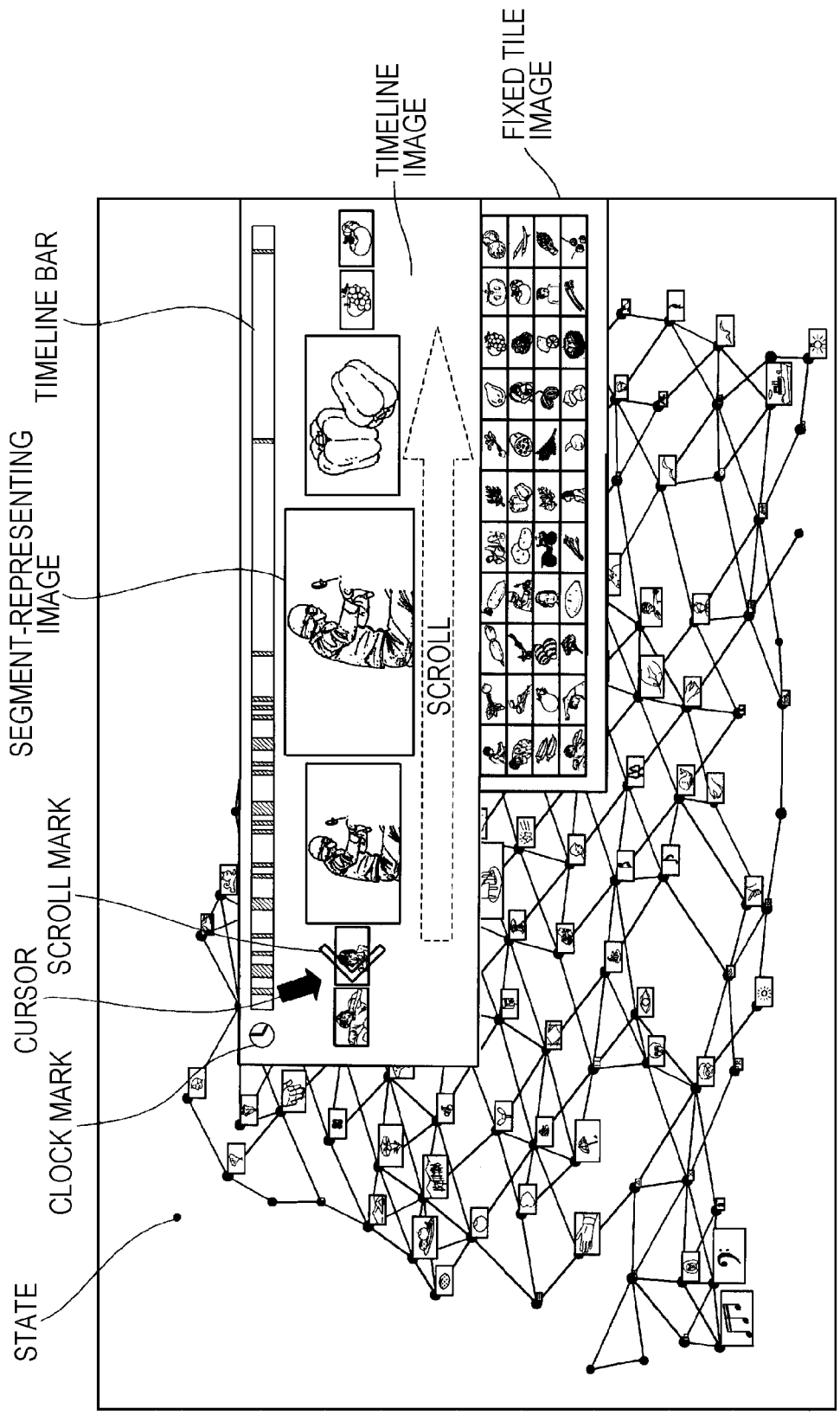
FIG. 20 is a diagram showing a display example of scrolling of segment-representing images as configuration images arranged in the timeline image.

FIG. 20 is a diagram showing a display example of scrolling of segment-representing images as configuration images arranged in the timeline image.

In the display control unit 16, the area of a part of the left end side of the timeline image is set to a past scrolling area (not shown) instructing scrolling to the side back in time and the area of a part of the right end side of the timeline image is set to a future scrolling area (not shown) instructing scrolling to the side forward in time.

Here, one or both of the past scroll area and the future scroll area set in the timeline image are below simply referred to as the scroll area.

In a case where the position of the cursor which is the instructed position of the user is within the scroll area set on the timeline image in the layer 2 mode, the display control unit 16 displays a scroll mark for notifying the user of the performing of the scrolling and scrolls the segment-representing images as the configuration images arranged in the timeline image.

In FIG. 20, the cursor is positioned in the past scroll area of the left end side set on the timeline image and the scroll mark representing the performing of the scrolling to the side back in time is displayed at the left end of the timeline image.

In this case, the display control unit 16 sets a segment-representing image of the past side adjacent to the representative image of interest as a center image to be arranged at the central portion of the timeline image from among the segment-representing images in chronological order associated with the state of interest and newly selects a total of 7 segment-representing images including the center image and 3 segment-representing images respectively continuing before and after the center image as the configuration images.

Here, the display control unit 16 arranges the newly selected configuration images in chronological order instead of the configuration images currently displayed in the timeline image.

As a result, the configuration images configuring the timeline image are set as 7 segment-representing images with the segment-representing image of the side back in time adjacent to the representative image of interest set as the center from among the segment-representing images in chronological order associated with the state of interest, and, in the side back in time, scrolling is performed to the side back in time by 1 segment-representing image.

Here, the direction of the scroll to the side back in time is the direction from left to right as shown by the arrow in FIG. 20 (the configuration images configuring the timeline image are shifted in the direction from left to right).

As described above, after scrolling has been performed, if the cursor remains positioned within the past scrolling area of the left end side set on the timeline image, the display control unit 16 maintains the display of the scroll mark, sets a segment-representing image of the side back in time adjacent to the center image as a new center image from among the segment-representing images in chronological order associated with the state of interest, and newly selects a total of 7 segment-representing images including the new center image and 3 segment-representing images respectively continuing before and after the new center image as the configuration images.

Here, the display control unit 16 arranges the newly selected configuration images in chronological order instead of the configuration images currently displayed in the timeline image.

As a result, the configuration images configuring the timeline image are set as 7 segment-representing images in chronological order with the segment-representing image of the side back in time adjacent to the previous center image from among the segment-representing images in chronological order associated with the state of interest, and, in the side back in time, scrolling is performed to the side back in time by 1 segment-representing image.

Below, as long as the cursor is positioned within the past scrolling area of the left end side set on the timeline image, the same process is performed and the scrolling to the side back in time of the timeline image is continued.

Here, although not shown, in a case where the cursor is positioned within the future scrolling area of the right end side set on the timeline image, a scroll mark representing the performing of the scrolling to the side forward in time is displayed on the right end of the timeline image and the timeline image is scrolled to the side forward in time (the scrolling direction id the direction from right to left).

Therefore, in the layer 2 mode, the user is able to scroll the timeline image simply by moving the cursor in the scrolling area (past scrolling area, future scrolling area) on the timeline image, and as a result, is able to easily find (segment-representing images of) desired video segments.

[Reproduction Control of Video Segment by Reproduction Control Unit 15]

Even when the display mode is any one of the layer 0 mode, the layer 1 mode, and the layer 2 mode, when double clicking is performed with respect to a segment-representing image of a video segment for example, as reproduction operation requesting reproduction of the video segment, the reproduction control unit 15 reproduces the video segment, which corresponds to the segment-representing image on which the double clicking (reproduction operation) was performed, from the content storage unit 11.

The images of video segments reproduced in the reproduction control unit 15 are supplied to the display control unit 16 and displayed on the display unit 17.

Figure 21:
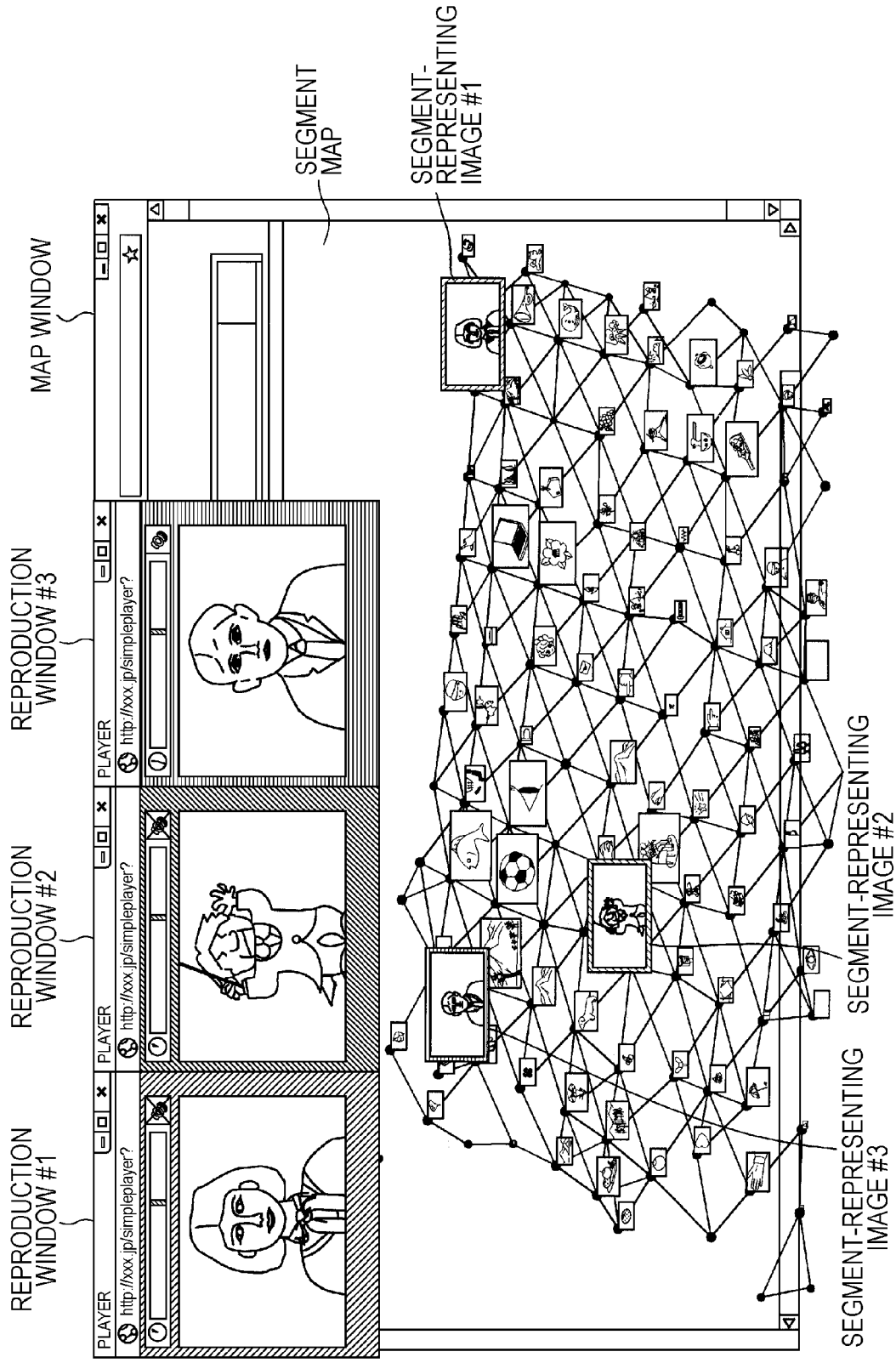
FIG. 21 is a diagram showing a display example of an image of a video segment reproduced in a reproduction control unit.

FIG. 21 is a diagram showing a display example of the image of the video segments played in the playback control unit 15.

In FIG. 21, the map window displaying the segment map and the reproduction windows #1, #2, and #3 displaying the images of the video segments are open.

In FIG. 21, in the layer 0 mode, first, the segment-representing image (segment-representing image selected as a cluster representation image) #1 arranged in the segment map of the reproduction target content displayed in the map window is double clicked, and, in the reproduction control unit 15, according to this double clicking, the reproduction of the video segment #1 corresponding to the segment-representing image #1 is started and the image of the video segment #1 is displayed in the reproduction window #1.

In addition, in FIG. 21, the segment-representing image #2 arranged in the segment map of the reproduction target content displayed in the map window is double clicked during the reproduction of the video segment #1 corresponding to the segment-representing image #1, and, in the reproduction control unit 15, according to this double clicking, the reproduction of the video segment #2 corresponding to the segment-representing image #2 is started and the image of the video segment #2 is displayed in the reproduction window #2.

Thereafter, in FIG. 21, the segment-representing image #3 arranged in the segment map of the reproduction target content displayed in the map window is double clicked during the reproduction of the video segments #1 and #2 respectively corresponding to the segment-representing images #1 and #2, and, in the reproduction control unit 15, according to this double clicking, the reproduction of the video segment #3 corresponding to the segment-representing image #3 is started and the image of the video segment #3 is displayed in the reproduction window #3.

As described above, in the reproduction control unit 15, when double clicking is performed as a reproduction operation with respect to a segment-representing image of the reproduction target content, reproduction control reproducing the video segment corresponding to the segment-representing image for which the double clicking was performed is performed.

Here, in the reproduction control unit 15, when the reproduction of another video segment is being performed at the time of reproducing a video segment corresponding to a double clicked segment-representing image, the reproduction of the other video segment which is already being performed is maintained as it is and the video segment corresponding to the double clicked segment-representing image is reproduced.

Accordingly, the user will be able to simultaneously view a plurality of places within a plurality of scenes or the like of interest within reproduction target content which is a single item of content.

In addition, as well as opening a reproduction window and performing display in that window, the image of the video segment (below, also referred to as reproduction video segment) for which reproduction is being performed is able to be displayed on the segment map at a size or the like greater than the standard size of the segment-representing image in the vicinity of the state with which the segment-representing image of the reproduction video segment is associated.

Whether to display the image of the reproduction video segment in a reproduction window or on the segment map in the vicinity of the state with which the segment-representing image of the reproduction video segment is associated is able to be set according to the operation of the user, for example.

In addition, the image of the reproduction video segment is able to be displayed in both of the reproduction window and the vicinity of the state with which the segment-representing image of the reproduction video segment is associated.

In addition, in a case where the image of the reproduction video segment is displayed in the reproduction window, it is possible, for example, to provide the same decoration for the reproduction window, and the segment-representing image displayed in the vicinity of the state with which (the segment-representing image of) the reproduction video segment for which the image is displayed in the reproduction window is associated.

In FIG. 18, a pattern of lines sloping up and left is provided in a frame surrounding the image as the same decoration for the reproduction window #1 and the segment-representing image #1 displayed in the vicinity of the state with which the video segment #1, for which the image is displayed in the reproduction window #1, is associated.

In addition, in FIG. 18, a pattern of lines sloping up and right is provided in a frame surrounding the image as the same decoration for the reproduction window #2 and the segment-representing image #2 displayed in the vicinity of the state with which the video segment #2, for which the image is displayed in the reproduction window #2, is associated, and, a pattern of horizontal lines is provided in a frame surrounding the image as the same decoration for the reproduction window #3 and the segment-representing image #3 displayed in the vicinity of the state with which the video segment #3, for which the image is displayed in the reproduction window #3, is associated.

In such a case, the user is able to immediately identify the state with which the (segment-representing image of) the video segment for which the image is displayed in the reproduction window.

In addition, in a case where the image of the reproduction video segment is displayed in the reproduction window, a reproduction window is opened with respect to a segment-representing image every time double clicking as a reproduction operation is performed and the images of the video segments corresponding to the double clicked segment-representing images are displayed in the opened windows.

Immediately after double clicking is performed with respect to a segment-representing image and the reproduction window for displaying the image of the video segment corresponding to the segment-representing image is opened, the reproduction window (only) becomes a so-called active window.

In addition, in a case where a plurality of reproduction windows are already open, audio of the video segment for which the image is displayed in the reproduction window which is the last active window among the plurality of reproduction windows is output, and the audio of the video segments for which the images are displayed in other reproduction windows is muted.

Here, in the reproduction control unit 15, even when the display mode is any of the layer 0 mode, the layer 1 mode, and the layer 2 mode, when double clicking is performed with respect to a segment-representing image, reproduction of the video segment corresponding to the segment-representing image is performed.

In addition, the reproduction of the video segments is performed even in a case where double clicking is performed on segment-representing images arranged in the fixed tile image displayed in the layer 1 mode (FIG. 15), highlighted and displayed segment-representing images (FIG. 17), or segment-representing images (FIG. 18 and FIG. 20) arranged in the timeline image displayed in the layer 2 mode, as well as the segment-representing images on the segment map.

Accordingly, regardless of the display mode, it is possible for the user to view the video segment corresponding to the segment-representing image simply by performing double clicking on the segment-representing image, that is, a unified operation.

Figure 22:
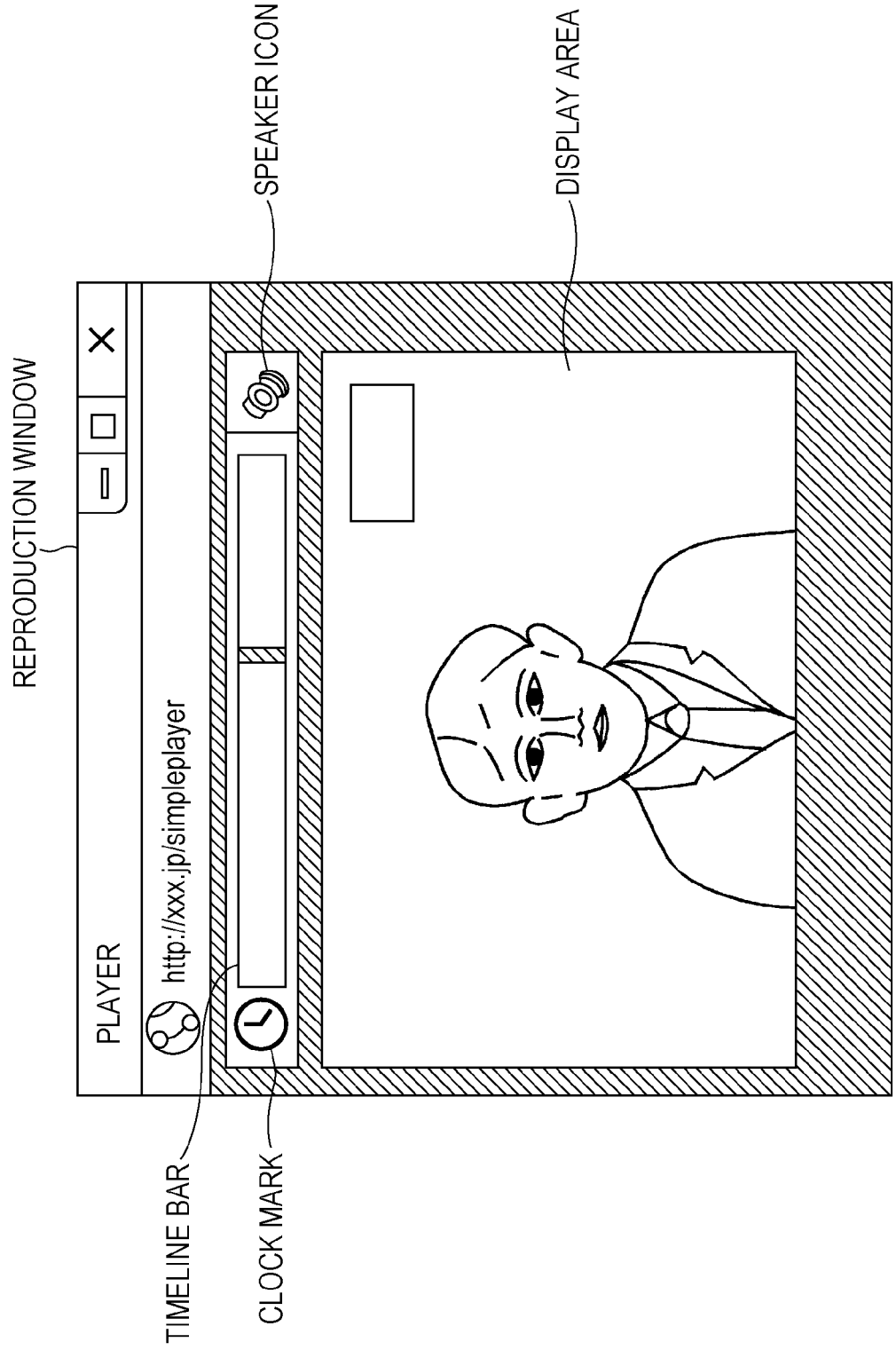
FIG. 22 is a diagram showing a display example of a reproduction window.

FIG. 22 is a diagram showing a display example of a reproduction window.

A large portion of the reproduction window is a display area in which the image of the video segment is displayed. Here, in the upper part of the display area, a clock mark, a timeline bar, and a speaker icon are arranged.

The clock mark and the timeline bar are the same as the clock mark and the timeline bar of FIG. 16.

However, the clock mark of the reproduction window displays the time representing the timing of the reproduction of the video segment for which the image is displayed on the reproduction window, within the reproduction target content.

In addition, in the timeline bar of the reproduction window, a portion (portion marked with diagonal lines) equivalent to the timing of the reproduction, in the reproduction target content, of the video segment for which the image is displayed in the reproduction window is displayed differently to the other portions.

The speaker icon is an icon showing whether the mute of the audio of the video segment for which the image is displayed in the display area is on or off, and displays a speaker in the active reproduction window and displays a crossed out speaker in the inactive reproduction windows.

Figure 23:
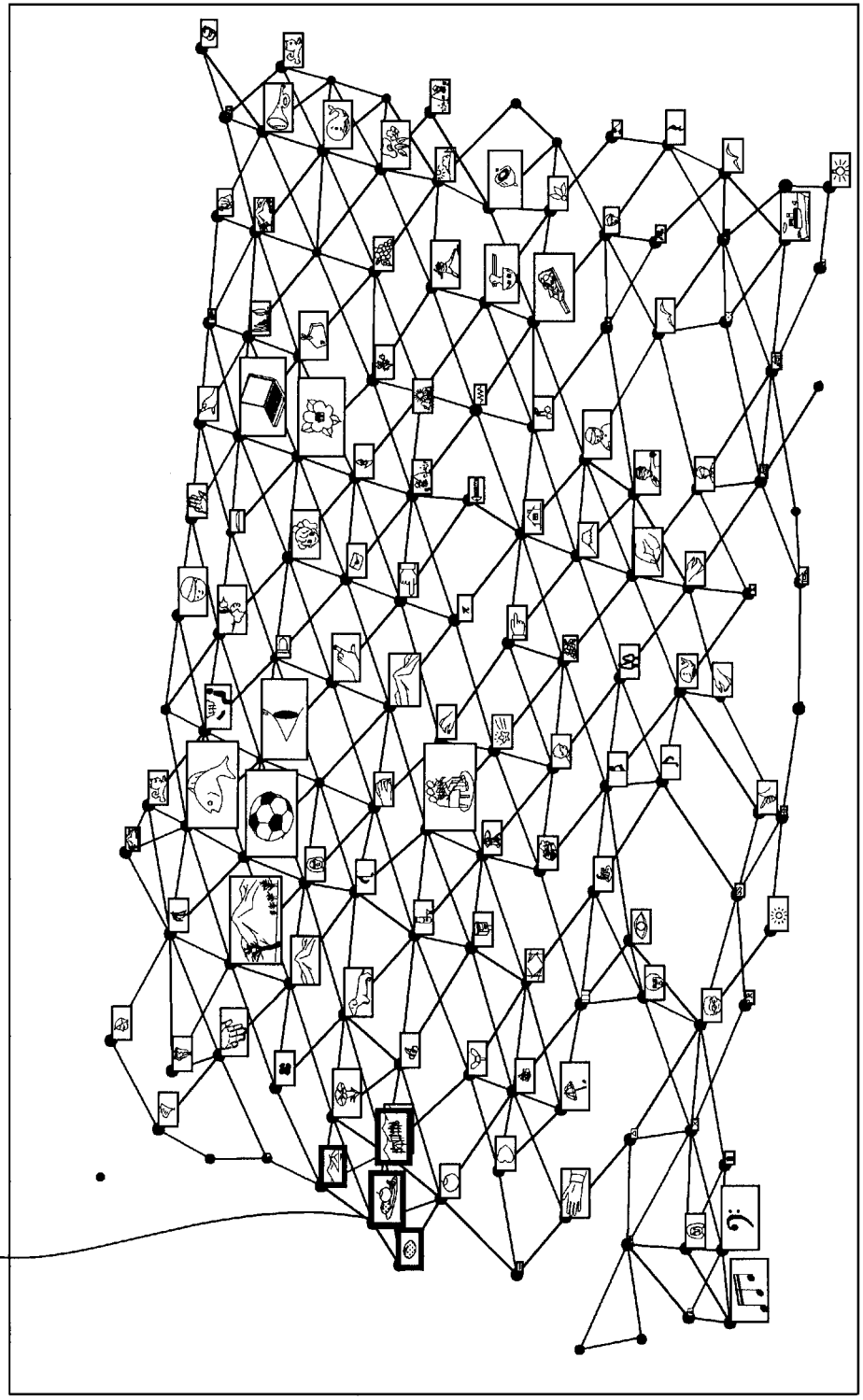
FIG. 23 is a diagram showing a display example of a segment map in a case where favorite information is stored in a favorite information storage unit.

FIG. 23 is a diagram showing a display example of a segment map of the layer 0 mode in a case where favorite information is stored (registered) in the favorite information storage unit 13.

As described in FIG. 16, in the layer 1 mode, when the user performs a favoriting operation, that is, when the save button operation is performed in a case where the state of interest is provisionally registered as a favorite state, in the operation event processing unit 12 (FIG. 1), an association is made with the user ID identifying the user (who performed the favoriting operation), and the model ID identifying the HMM as the model of interest used in the generation of the model map of the base of the segment map of the reproduction target content and the state ID identifying the state actually registered as the favorite state are stored (registered) in the favorite information storage unit 13 (FIG. 1) as favorite information.

Here, the state for which the state ID is stored as the favorite information in the favorite information storage unit 13 is also referred to as a registered state.

In a case where the user inputs a user ID when using the image processing apparatus of FIG. 1 and the user ID is stored in the favorite information storage unit 13 as (a part of) the favorite information, the display control unit 16 (FIG. 1) reads out the model ID and the state ID with which the user ID of the user (below referred to as a using user) using the image processing apparatus is associated from the favorite information storage unit 13.

In addition, in a case where the HMM as the clustering model used in the generation of the segment map of the reproduction target content is an HMM identified using the model ID associated with the user ID of the using user, that is, in a case where the segment map of the reproduction target content is generated using the HMM identified using the model ID associated with the user ID of the using user, the display control unit 16 highlights and displays the segment map segment-representing image (selected as the cluster representation image) associated with the registered state which is a state identified using the state ID associated with the user ID of the using user.

In FIG. 23, the segment-representing image associated with the registered state of the segment map is highlighted and displayed by being surrounded with a frame.

Here, in the segment map generating unit 14, for example, the same HMM is used in the generation of the segment map of a news program which is broadcast regularly each day or the like. That is, the HMM used in the generation of the segment map of the news program which is broadcast regularly may also be referred to as a news HMM.

Here, the using user looks at the segment map of the news program of a certain day and performs a favoriting operation, whereby the state with which a segment-representing image of the video segment as a scene of interest is associated is set as a registered state, and the state ID of the registered state is associated with the user ID of the using user as well as the model ID of the news HMM, set as favorite information, and set to be stored in the favorite information storage unit 13 (FIG. 1).

In such a case, on a following day, when the using user selects the latest news program broadcast on that day as reproduction target content, a segment map of the latest news program which is the reproduction target content is generated using the news HMM in the segment map generating unit 14.

Then, in the display control unit 16, the registered state of the news HMM is identified from the favorite information stored in the favorite information storage unit 13 and a segment-representing image generated using the news HMM and associated with the registered state of the segment map of the latest news program is highlighted and displayed.

Therefore, for example, by the user looking at a segment map of a news program broadcast in the past performing a favoriting operation, and setting, as a registered state, the state with which a segment-representing image of the video segment as a scene of interest is associated, in the segment map of the news program broadcast thereafter, since a segment-representing image associated with the registered state is highlighted and displayed, it is possible to identify at a glance the state (registered state) with which (the segment-representing image of) the video segment as a scene of interest is associated.

In addition, in the reproduction control unit 15, since the video segment corresponding to the segment-representing image is reproduced simply by double clicking the segment-representing image, the user is able to easily view a scene of interest, that is, a video segment corresponding to the segment-representing image associated with the registered state by double clicking the segment-representing image highlighted and displayed in the segment map of the news program broadcast thereafter.

That is, by the user looking at a segment map of a news program broadcast on a certain day, performing a favoriting operation, and for example, setting in advance, as registered states, (one or more) states with which a segment-representing image of the video segment showing a scene of a sports section is associated, in the segment map (segment map of layer 0 mode) of the news programs broadcast thereafter, since a segment-representing image associated with the registered state, that is, the segment-representing image of the video segment showing a scene of a sports section is highlighted and displayed, the user is able to easily view only the scenes of the sports section with regard to the news programs broadcast thereafter.

FIG. 24 is a diagram illustrating the reproduction of a video segment performed by double-clicking a segment-representing image highlighted and displayed in the segment map.

In FIG. 24, the user double clicks a segment-representing image highlighted and displayed in the segment map of the layer 0 mode, and according to the double clicking, the reproduction of the video segment is started, along with which, a reproduction window is opened and the video of the video segment for which reproduction has started is displayed in the reproduction window.

Here, in a case where any one of the states of (the HMM as the clustering model used in the generation of) the segment map becomes a registered state, in the reproduction control unit 15 (FIG. 1), when the segment-representing image (segment-representing image associated with any one of the registered states) highlighted and displayed in the segment map is double clicked, instead of just reproducing the video segment corresponding to the segment-representing image, it is possible to reproduce in chronological order all the video segments associated with all the registered states in the segment map.

In such a case, for example, by the using user setting in advance all the states for which segment-representing images of the video segments shown in the scenes of the sports section of the news program are associated as registered states, simply by double clicking the segment-representing images (highlighted and displayed segment-representing images) associated with any one of the registered states of the segment map of the news program, only the video segments (video segments corresponding to the segment-representing images associated with the registered states) in which the scenes of the sports section of the news program are shown are reproduced in chronological order in the reproduction control unit 15, and, as a result, a digest reproduction of only the sports section, that is, cued reproduction of video segments, in which the scenes of the sports section are shown, in chronological order is performed.

Here, since (the state ID of) the registered state is associated with the user ID, set as favorite information, and stored in the favorite information storage unit 13 (FIG. 1), it is able to be stored in advance for each user.

Accordingly, when the reproduction control unit 15 reproduces, in chronological order, all the video segments associated with all the registered states in the segment map in a case where a segment-representing image associated with any one of the registered state has been double clicked, it is possible, for each user, to reproduce the scenes in which the user has an interest and to realize highlighted reproduction (individualization of the highlighted reproduction) for each user.

Here, in a case where any one of the states of the segment map becomes a registered state, when the segment-representing image (segment-representing image associated with any one of the registered states) highlighted and displayed in the segment map is double clicked, it is possible to set, according to the operation of the user, whether to just reproduce the video segment corresponding to the segment-representing image, or, to reproduce in chronological order all the video segments associated with all the registered states in the segment map.

As described above, in the image processing apparatus shown in FIG. 1, since the content of the video is used as content for learning, learning of the HMM as the clustering model is performed, and the HMM after learning is projected onto a two-dimensional flat surface, a model map in which the scene structure of the content is expressed by a graph is generated.

Meanwhile, each frame of the reproduction target content is clustered using the HMM after learning, and the frames belonging to each cluster are divided into one or more continuous frames as video segments.

Here, a segment map is generated in which, at positions of each state of the HMM on the model map, segment-representing images representing video segments (configured by frames) belonging to clusters corresponding to states are arranged.

Accordingly, the user is able to look over the reproduction target content by looking at the segment map.

In addition, in the image processing apparatus shown in FIG. 1, when the segment-representing images arranged on the segment map or the like are double clicked, since the video segments (video segments representing the segment-representing images thereof) corresponding to the segment-representing images are reproduced, the user is able to easily find the segment-representing image of a desired scene using the segment map and quickly access (view the desired scene) the video segment in which the scene is shown.

As described above, according to the image processing apparatus in FIG. 1, it is possible to realize a new browsing method with the characteristic that it is possible to look over the reproduction target content and efficiently access a desired scene.

In addition, in the image processing apparatus shown in FIG. 1, when the reproduction of another video segment is being performed at the time of reproducing a video segment corresponding to a double clicked segment-representing image, the reproduction of the other video segment which is already being performed is maintained as it is and the video segment corresponding to the double clicked segment-representing image is reproduced.

Therefore, according to the image processing apparatus in FIG. 1, each one of a plurality of people in a family or the like is able to simultaneously view different places in which they each have an interest, within the same content, and, in addition, it is possible to provide a content reproduction device suitable for so-called "while viewing" or "zapping while looking" which the digital native generation are good at.

[Display Mode Transitions and Processing Performed in Each Display Mode]

Figure 25A:
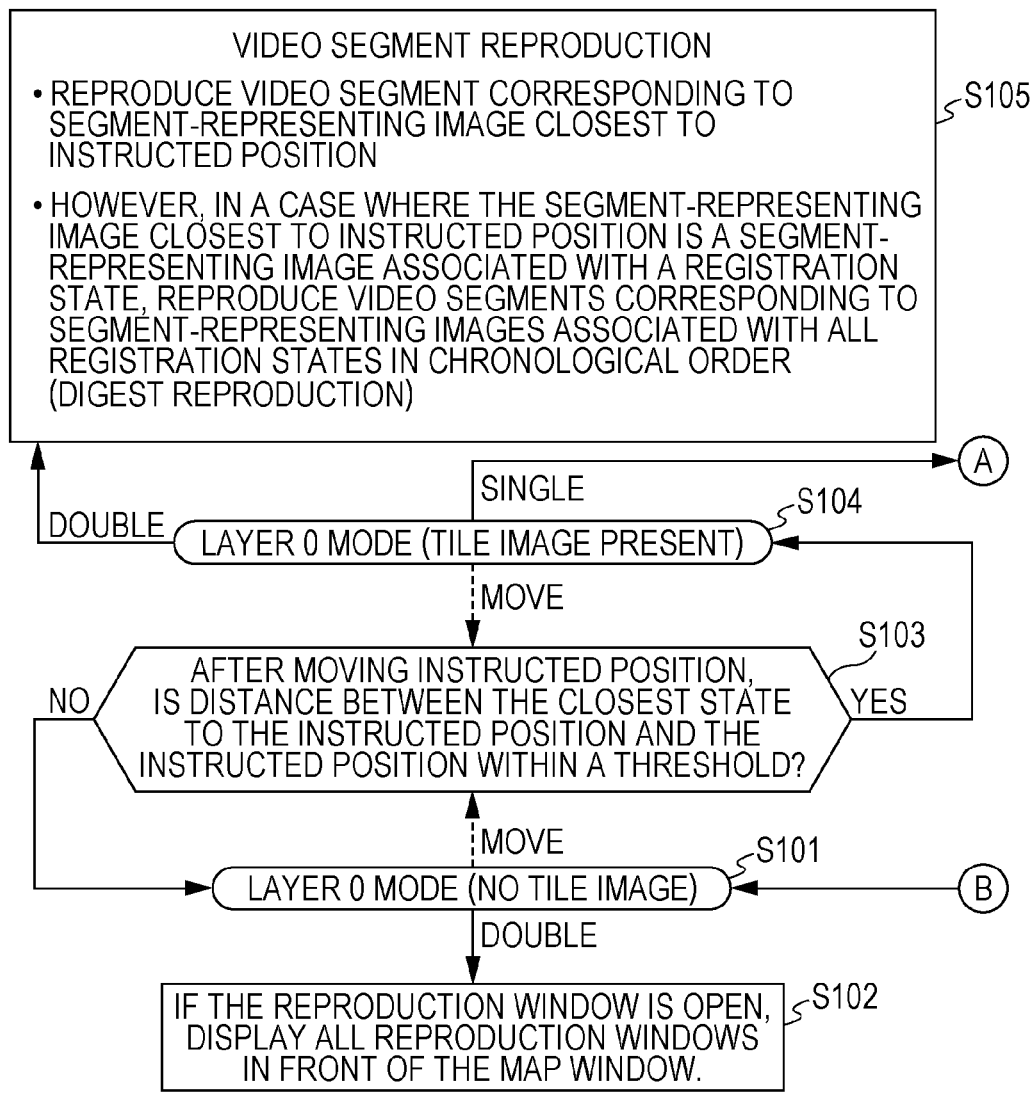
FIGS. 25A and 25B are diagrams illustrating transitions of the display mode and processing performed in each display mode.
Figure 25B:
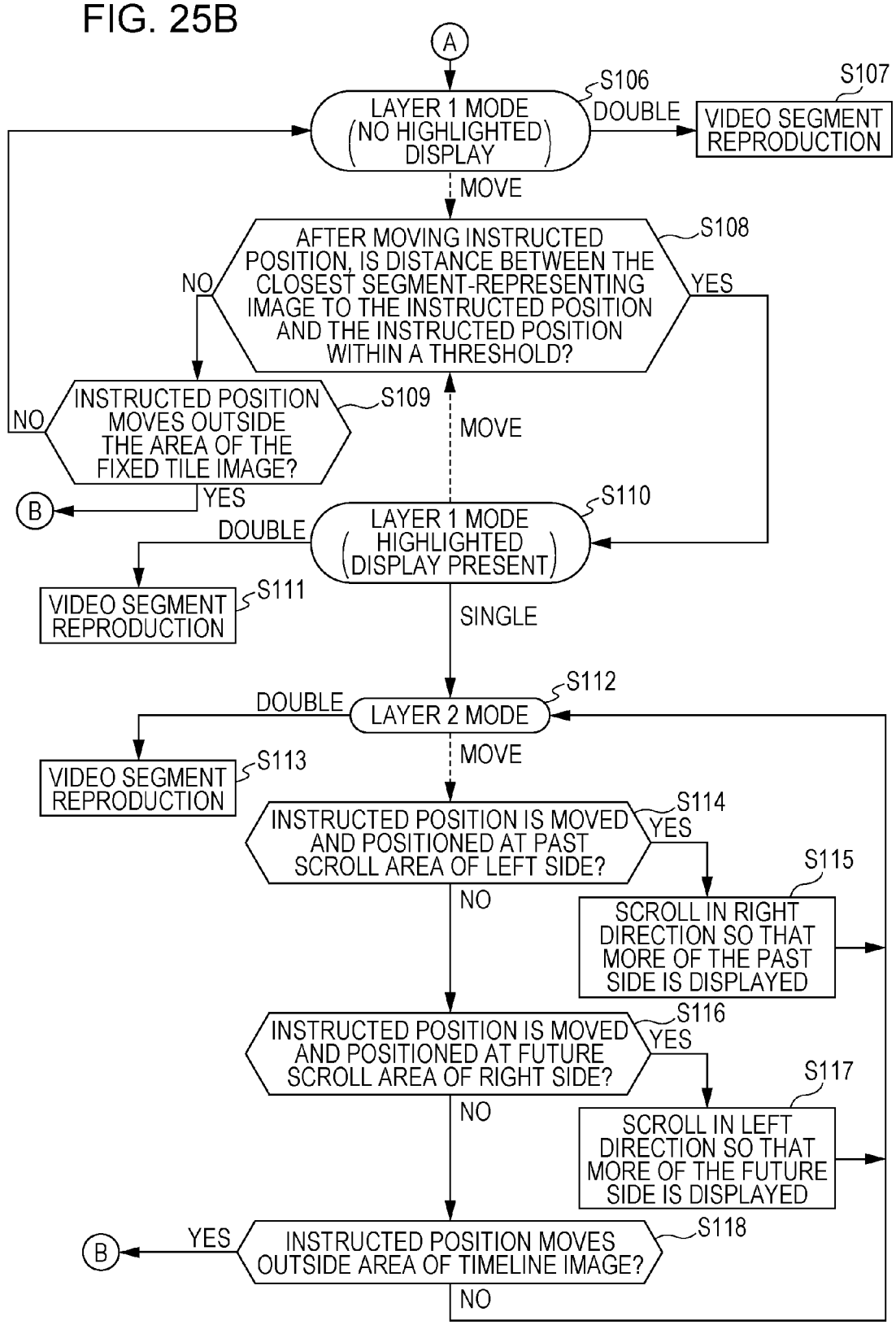

FIGS. 25A and 25B are diagrams illustrating transitions of the display mode and processing performed in each display mode.

When the segment map of the reproduction target content from the segment map generating unit 14 is supplied, in step S101, the display control unit 16 sets the display mode to the layer 0 mode and displays (the map window displaying) the segment map on the display unit 17.

In addition, in the layer 0 mode in step S101, as shown in FIG. 10, only the segment map is displayed without displaying the tile image (FIG. 13).

In the layer 0 mode of step S101 in which the tile image is not displayed, when the user performs double clicking, the process moves to step S102, and, if a reproduction window is opened, the display control unit 16 displays all the reproduction windows in front of the map window in which the segment map is displayed.

Further, when a predetermined time elapses from becoming the layer 0 mode in which the tile image is not displayed in step S101, the process moves to step S103, and the display control unit 16 determines whether or not a distance (cursor interval distance) between an instructed position to which the position of the cursor is moved as an instructed position instructed by the user and the state on the segment map closest to the instructed position is within a threshold.

Here, in FIG. 25, the dotted-line arrow represents moving to a step on the finishing point side of the arrow when a predetermined time elapses from performing (from becoming) the step on the starting point side of the arrow.

In step S103, in a case where the cursor interval distance is determined not to be within a threshold, the process moves to step S101. Here, when a predetermined time has elapsed, the process moves to step S103 from step S101 and the same processing as below is repeated.

On the other hand, in step S103, in a case where it is determined that the cursor interval distance is within the threshold or less, the process proceeds to step S104, the display control unit 16 generates a tile image in which the segment-representing images associated with the state of interest, which is the state on the segment map closest to the instructed position, are lined up in chronological order, and, as shown in FIG. 13, display is performed in a form superimposed in the vicinity of the state of interest of the segment map.

As described above, in step S104, in the layer 0 mode, the tile image is displayed; however, in this manner, when a predetermined time elapses from becoming the layer 0 mode in which the tile image is displayed in step S104, the process moves to step S103, and the display control unit 16 determines whether or not the cursor interval distance which is the distance between an instructed position to which the position of the cursor is moved as an instructed position instructed by the user and the state on the segment map closest to the instructed position is within a threshold.

In step S103, in a case where the cursor interval distance is determined not to be within a threshold, the process moves to step S101, the tile image is erased and the mode becomes the layer 0 mode in which the tile image is not displayed.

Further, in step S103, in a case where it is determined that the cursor interval distance is within the threshold or less, the process proceeds to step S104, the display control unit 16 generates a tile image in which the segment-representing images associated with the state of interest, which is the state on the segment map closest to the instructed position, are lined up in chronological order, and, as shown in FIG. 13, display is performed in a form superimposed in the vicinity of the state of interest of the segment map.

In addition, when double clicking is performed in the layer 0 mode (FIG. 13) in which the tile image is displayed in step S104, the process proceeds to step S105 and the reproduction control unit 15 performs a video segment reproduction process which reproduces a video segment.

In other words, in the video segment reproduction process of step S105, the reproduction control unit 15 reproduces the video segment corresponding to the segment-representing image closest to the instructed position (double clicked position) of the user when the double clicking is performed.

In addition, in a case where the segment-representing image closest to the instructed position is a segment-representing image associated with a registered state of (the HMM used in the generation of) the segment map, that is, in a case where the segment-representing image associated with the registered state of the segment map is double clicked, the reproduction control unit 15 performs digest reproduction reproducing, in chronological order, the video segments corresponding to all the segment-representing images associated with all the registered states of the segment map as described in FIG. 24.

In the layer 0 mode (FIG. 13) of step S104, in which the tile image is not displayed, when a single click is performed, the process proceeds to step S106 and the display control unit 16 moves the display mode from the layer 0 mode to the layer 1 mode and, as shown in FIG. 15, displays a fixed tile image in which the tile images displayed immediately before are fixed.

In addition, in the layer 1 mode of step S106, as shown in FIG. 15, the highlighted display of the segment-representing image arranged in the fixed tile image is not performed.

When double clicking is performed by the user in the layer 1 mode without highlighted display in step S106, the process proceeds to step S107 and, in the same manner as step S105, the reproduction control unit 15 performs a video segment reproduction process.

That is, the reproduction control unit 15 reproduces video segments corresponding to double clicked segment-representing images (in a case where segment-representing images associated with the registered states of the segment map are double clicked, digest reproduction is performed so as to reproduce, in chronological order, the video segments corresponding to all the segment-representing images associated with all the registered states of the segment map).

When a predetermined time elapses from becoming the layer 1 mode without highlighted display in step S106, the process moves to step S108, and the display control unit 16 determines whether or not a distance between an instructed position to which the position of the cursor is moved as an instructed position instructed by the user and the segment-representing image arranged in the fixed tile image (FIG. 15) closest to the instructed position is within a threshold.

In step S108, in a case where it is determined that the distance between the instructed position and the segment-representing image arranged in the fixed tile image closest to the instructed position is not within a threshold, the process proceeds to step S109 and the display control unit 16 determines whether or not the instructed position is not on the fixed tile image, that is, if the instructed position has moved outside the area displaying the fixed tile image.

In step S109, in a case where it is determined that the instructed position is on the fixed tile image (FIG. 15), the process proceeds to step S106. Here, when a predetermined time has elapsed, the process moves to step S108 from step S106 and the same processing as below is repeated.

In addition, in step S109, in a case where it is determined that the instructed position is not on the fixed tile image (FIG. 15), the process proceeds to step S101 and the display control unit 16 moves the display mode from the layer 1 mode to the layer 0 mode.

In the layer 0 mode in step S101, as shown in FIG. 10, only the segment map is displayed without displaying the tile image.

Here, the fixed tile image (FIG. 15) displayed in the layer 1 mode immediately before moving to the layer 0 mode of step S101 is erased at the time of moving from the layer 1 mode to the layer 0 mode.

Meanwhile, in step S108, in a case where it is determined that the distance between the instructed position and the segment-representing image arranged in the fixed tile image closest to the instructed position is within a threshold, the process proceeds to step S110 and the display control unit 16 performs highlighted display of the representative image of interest which is the segment-representing image arranged in the fixed tile image closest to the instructed position as shown in FIG. 17.

As described above, in step S110, in the layer 1 mode, the segment-representing images closest to the instructed position among the segment-representing images arranged in the fixed tile image are highlighted and displayed as representative images of interest.

Here, when a predetermined time has elapsed from becoming the layer 1 mode (layer 1 mode in which highlighted display is performed) having a highlighted display in step S110 in this manner, the process moves to step S108 and the same processing as below is repeated.

Further, when double clicking is performed by the user in the layer 1 mode having a highlighted display in step S110, the process proceeds to step S111 and, in the same manner as step S105, the reproduction control unit 15 performs a video segment reproduction process.

That is, the reproduction control unit 15 reproduces video segments corresponding to double clicked segment-representing images (in a case where segment-representing images associated with the registered states of the segment map are double clicked, digest reproduction is performed so as to reproduce, in chronological order, the video segments corresponding to all the segment-representing images associated with all the registered states of the segment map).

In the layer 1 mode (FIG. 17) having highlighted display of step S110, when a single click is performed, the process proceeds to step S112 and the display control unit 16 moves the display mode from the layer 1 mode to the layer 2 mode and, as shown in FIG. 18, displays a timeline image in which a plurality of segment-representing images are arranged in chronological order so as to center on the segment-representing image highlighted and displayed immediately before.

When double clicking is performed by the user in the layer 2 mode in step S112, the process proceeds to step S113 and, in the same manner as step S105, the reproduction control unit 15 performs a video segment reproduction process.

That is, the reproduction control unit 15 reproduces video segments corresponding to double clicked segment-representing images (in a case where segment-representing images associated with the registered states of the segment map are double clicked, digest reproduction is performed so as to reproduce, in chronological order, the video segments corresponding to all the segment-representing images associated with all the registered states of the segment map).

When a predetermined time elapses from becoming the layer 2 mode (FIG. 18) in step S112, the process moves to step S114, and the display control unit 16 determines whether or not the instructed position to which the position of the cursor is moved as an instructed position instructed by the user is positioned within a past scrolling area of the left end side set in the timeline image.

In step S114, in a case where the instructed position is determined to be positioned within the past scrolling area, the process proceeds to step S115 and the display control unit 16 scrolls the timeline image as shown by the arrow in FIG. 20 so as to display the segment-representing images of the side further back in time, and the process proceeds to step S112.

Further, in step S114, in a case where it is determined that the instructed position is not positioned within the past scrolling area, the process moves to step S116, and the display control unit 16 determines whether or not the instructed position is moved and whether the instructed position is positioned within a future scrolling area of the right end side set in the timeline image.

In step S116, in a case where the instructed position is determined to be positioned within the future scrolling area, the process proceeds to step S117 and the display control unit 16 scrolls the timeline image so as to display the segment-representing images of the side further forward in time, and the process proceeds to step S112.

Further, in step S116, in a case where the instructed position is determined not to be positioned within the future scrolling area, that is, in a case where the instructed position is not positioned in either of the past scrolling area or the future scrolling area, the process proceeds to step S118 and the display control unit 16 determines whether the instructed position is not on the timeline image (FIG. 18, FIG. 20), that is, whether or not the instructed position has moved outside the area displaying the timeline image.

In step S118, in a case where it is determined that the instructed position is on the timeline image (FIG. 18, FIG. 20), the process proceeds to step S112. Here, when a predetermined time has elapsed, the process moves to step S114 from step S112.

Further, in step S118, in a case where it is determined that the instructed position is not on the timeline image, the process proceeds to step S101 and the display control unit 16 moves the display mode from the layer 2 mode to the layer 0 mode.

In the layer 0 mode in step S101, as shown in FIG. 10, only the segment map is displayed without displaying the tile image.

Here, the timeline image (FIG. 18, FIG. 20) displayed in the layer 2 mode immediately before moving to the layer 0 mode of step S101 is erased at the time of moving from the layer 2 mode to the layer 0 mode.

[Description of Computer in which the Present Technology is Applied]

Next, the above-described series of process are able to be performed using hardware or performed using software. In a case where the series of processes is performed using software, the program configuring the software is installed in a general-purpose computer or the like.

Here, FIG. 26 shows a configuration example of an embodiment of a computer in which a program executing the above-described series of process is installed.

The program may be recorded in advance in a hard disk 105 or a ROM 103 as a recording medium built into the computer.

Alternatively, the program may be stored (recorded) in advance in a removable recording medium 111. This removable recording medium 111 is able to be provided as so-called package software. Here, as the removable recording medium 111, for example, there are a flexible disk, a CD-ROM (Compact Disc Read Only Memory), a MO (Magneto Optical) disc, a DVD (Digital Versatile Disc), a magnetic disk, a semiconductor memory, and the like.

In addition, as well as installing the program onto a computer from the above-described removable recording medium 111, it is possible to perform installation onto the built-in hard disk 105 after downloading to the computer through a communication network or a broadcasting network. In other words, for example, the program is able to be transmitted wirelessly from the download site to the computer through an artificial satellite for digital satellite broadcasting, or is able to be transmitted using wires to the computer through a LAN (Local Area Network) or a network such as the Internet.

The computer has a built-in CPU (Central Processing Unit) 102, and an input and output interface 110 is connected to the CPU 102 via a bus 101.

When a command is input by the user through an operation or the like of the input unit 107 via the input and output interface 110, the CPU 102 executes the program stored in the ROM (Read Only Memory) 103 in accordance therewith. Alternatively, the CPU 102 loads the program stored in the hard disk 105 into the RAM (Random Access Memory) 104 and performs execution thereof.

In this manner, the CPU 102 performs a process according to the above-described flowchart, or a process performed according to the configuration of the above-described block diagram. Here, for example, the CPU 102 outputs this processing result from the output unit 106 through the input/output interface 110 as necessary, or, transmits the processing result from a communication unit 108 and performs recording or the like in the hard disk 105.

In addition, the input unit 107 is configured of a keyboard, a mouse, a microphone, or the like. Further, the output unit 106 is configured by an LCD (Liquid Crystal Display), a speaker, or the like.

Here, in the present specification, the process performed by the computer in accordance with the program may not be performed in the chronological order following the order described in the flowchart. That is, the process performed by the computer in accordance with the program also includes processes performed in parallel or separately (for example, parallel processing or processing by objects).

In addition, the program may be processed using one computer (processor) or may be distributed and processed by a plurality of computers. In addition, the program may be transferred to a distant computer and performed.

Here, the embodiments of the present technology are not limited to be the above-described forms, and various modifications are possible in a range not departing from the spirit of the present technology.

For example, the present technology may adopt a cloud computing configuration in which processing is performed by allotting one function to a plurality of cooperating apparatuses through a network.

In other words, in the image processing apparatus in FIG. 1, for example, the favorite information storage unit 13 and the segment map generating unit 14 are provided on the server side and the remaining content storage unit 11, operation event processing unit 12, reproduction control unit 15, display control unit 16, and display unit 17 is able to be provided on the client side.

Further, as well as being performed by one apparatus, each step described in the above flowchart is able to be performed by being allotted to a plurality of apparatuses.

In addition, in a case where a plurality of processes are included in one step, the plurality of processes included in the one step are able to be performed by being allotted to a plurality of apparatuses as well as being performed by one apparatus.

In other words, in the image processing apparatus in FIG. 1, the processes of a part of the segment map generating unit 14 are performed on the server side, and the remaining process is able to be carried out on the client side.

In addition, the present technology is able to adopt the following configuration.

[1] An image processing apparatus including: a display control unit displaying a segment map, which is a map in which segment-representing images, which are images representing video segments obtained by dividing content into video segments which are collections of frames of one or more temporally continuous frames, are arranged, on a display apparatus; and a reproduction control unit controlling reproduction of the video segments corresponding to the segment-representing image according to a reproduction operation of a user requesting reproduction with respect to the segment-representing image, in which, in a case where, during reproduction of a video segment of content, a reproduction operation is performed with respect to a segment-representing image of another video segment of content, the reproduction control unit reproduces another video segment, which is the video segment corresponding to the segment-representing image for which the reproduction operation was performed, while still maintaining reproduction of the video segment being reproduced.

[2] The image processing apparatus according to [1], further including: a map generating unit generating the segment map; a clustering unit clustering each frame of the content into clusters of any one of a plurality of clusters; a segment dividing unit dividing frames belonging to clusters into the video segments which are collections of one or more temporally continuous frames respectively for the plurality of clusters; and a segment-representing image generating unit generating segment-representing images representing the video segments, in which, the map generating unit associates segment-representing images of a video segment belonging to a cluster with the cluster for each of the plurality of clusters, selects a cluster representation image representing the cluster from the segment-representing images associated with the cluster, and arranges the segment-representing image selected as the cluster representation image on the segment map.

[3] The image processing apparatus according to [2], in which the clustering unit determines a maximum likelihood state series in which characteristic amounts in chronological series of frames of the content are observed using a state transition model having states and state transitions, and clusters each frame of the content into clusters corresponding to states in which characteristic amounts of the frames are observed in the maximum likelihood state series.

[4] The image processing apparatus according to [3], in which the map generating unit generates the segment map by generating a model map which is a map in which the state transition model is projected on a two-dimensional flat surface or into three-dimensional space, and arranging the segment-representing images selected as cluster representation images of clusters corresponding to the states at positions of each state on the model map.

[5] The image processing apparatus according to [4], in which the map generating unit selects a segment-representing image of a video segment for which a number of frames is largest or a segment-representing image of a video segment for which a reproduction time is earliest among the segment-representing images associated with the cluster corresponding to the state, as the cluster representation image.

[6] The image processing apparatus according to [4] or [5], in which the map generating unit arranges the segment-representing image selected as a cluster representation image of a cluster corresponding to the state at positions of each state on the model map at a size corresponding to an importance of the state.

[7] The image processing apparatus according to [6], in which the map generating unit determines a largest number of frames of a video segment corresponding to the segment-representing images associated with the cluster corresponding to the state as the importance of the state.

[8] The image processing apparatus according to any one of [4] to [7], further including a storage unit storing a state as a registered state according to a favoriting operation of a user requesting that the state be registered, in which the display control unit highlights and displays the segment-representing image of the segment map selected as the cluster representation image of a cluster corresponding to the registered state.

[9] The image processing apparatus according to [8], in which, when a reproduction operation is performed with respect to the segment-representing image selected as the cluster representation image of the cluster corresponding to the registered state, the reproduction control unit reproduces, in chronological order, the video segments corresponding to the segment-representing images associated with the clusters corresponding to all the registered states stored in the storage unit.

[10] The image processing apparatus according to any one of [4] to [9], in which the display control unit sets the state on the segment map closest to an instructed position instructed by the user as a state of interest to be focused on and performs display control displaying, on the display apparatus, a tile image which is an image of a list of the segment-representing images associated with the clusters corresponding to the state of interest.

[11] The image processing apparatus according to [10], in which the display control unit sets the segment-representing image closest to the instructed position as an image of interest to be focused on from among the segment-representing images of the tile image and highlights and displays the image of interest.

[12] The image processing apparatus according to [11], in which, according to a predetermined operation of a user, the display control unit performs display control displaying, on the display apparatus, a timeline image in which, from among the segment-representing images associated with the state of interest, the image of interest and a predetermined number of the segment-representing images continuing before and after the image of interest are arranged in chronological order with the image of interest as a center.

[13] The image processing apparatus according to [12], in which the display control unit scrolls the segment-representing image arranged in the timeline image according to an operation of the user.

[14] An image processing method including: displaying a segment map, which is a map in which segment-representing images, which are images representing video segments obtained by dividing content into video segments which are collections of frames of one or more temporally continuous frames, are arranged, on a display apparatus; and controlling reproduction of the video segments corresponding to the segment-representing image according to a reproduction operation of a user requesting reproduction with respect to the segment-representing image, in which, in the controlling of the reproduction of the video segment, in a case where, during the reproduction of a video segment of content, a reproduction operation is performed with respect to a segment-representing image of another video segment of the content, another video segment, which is a video segment corresponding to a segment-representing image for which the reproduction operation was performed, is reproduced while still maintaining the reproduction of the video segment being reproduced.

[15] A program causing a computer to execute: a displaying a segment map, which is a map in which segment-representing images, which are images representing video segments obtained by dividing content into video segments which are collections of frames of one or more temporally continuous frames, are arranged on a display apparatus; and a controlling reproduction of video segments corresponding to the segment-representing image according to a reproduction operation of a user requesting reproduction with respect to the segment-representing image, in which, in a case where, during reproduction of a video segment of content, a reproduction operation is performed with respect to a segment-representing image of another video segment of content, another video segment, which is a video segment corresponding to the segment-representing image for which the reproduction operation was performed, is reproduced while still maintaining the reproduction of the video segment being reproduced.

The present disclosure contains subject matter related to that disclosed in Japanese Priority Patent Application JP 2011-228538 filed in the Japan Patent Office on Oct. 18, 2011, the entire contents of which are hereby incorporated by reference.

What is claimed is:

1. An image processing apparatus comprising:
    a display control unit configured to display on a display apparatus a segment map comprising segment-representing images representing video segments obtained by dividing content into video segments, wherein the video segments comprise collections of frames of one or more temporally continuous frames;
    a reproduction control unit configured to control reproduction of the video segments corresponding to the segment-representing images according to user input comprising a reproduction operation requesting reproduction with respect to the segment-representing images; and
    a clustering unit configured to cluster each frame of the content into clusters of a plurality of clusters; wherein:
        in a case where, during reproduction of a video segment of the content, a reproduction operation is detected with respect to a segment-representing image of an other video segment of the content, the reproduction control unit reproduces the other video segment corresponding to the segment-representing image with respect to which the reproduction operation is detected, while maintaining reproduction of the video segment being reproduced; and
    the clustering unit is configured to:
        determine a maximum likelihood state series in which characteristic amounts in chronological series of frames of the content are observed using a state transition model having states and state transitions, and
        cluster each frame of the content into clusters corresponding to states in which characteristic amounts of the frames are observed in the maximum likelihood state series.

2. The image processing apparatus according to claim 1, further comprising:
    a map generating unit configured to generate the segment map;
    a segment dividing unit configured to divide frames belonging to the clusters into the video segments comprising collections of one or more temporally continuous frames respectively for the plurality of clusters; and
    a segment-representing image generating unit configured to generate segment-representing images representing the video segments, wherein:
    the map generating unit:
        associates segment-representing images of a video segment belonging to a cluster with the cluster for each of the plurality of clusters,
        selects a cluster representation image representing the cluster from the segment-representing images associated with the cluster, and
        arranges the segment-representing image selected as the cluster representation image on the segment map.

3. The image processing apparatus according to claim 2, wherein the map generating unit generates the segment map by generating a model map which is a map in which the state transition model is projected on a two-dimensional flat surface or into a three-dimensional space, and
    arranging the segment-representing images selected as cluster representation images of clusters corresponding to the states at positions of each state on the model map.

4. The image processing apparatus according to claim 3, wherein the map generating unit selects a segment-representing image of a video segment for which a number of frames is largest or a segment-representing image of a video segment for which a reproduction time is earliest among the segment-representing images associated with the cluster corresponding to the state, as the cluster representation image.

5. The image processing apparatus according to claim 3, wherein the map generating unit arranges the segment-representing image selected as a cluster representation image of a cluster corresponding to the state at positions of each state on the model map at a size corresponding to an importance of the state.

6. The image processing apparatus according to claim 5, wherein the map generating unit determines a largest number of frames of a video segment corresponding to the segment-representing images associated with the cluster corresponding to the state as the importance of the state.

7. The image processing apparatus according to claim 3, further comprising:
    a storage unit storing a state as a registered state according to a favoriting operation of a user requesting that the state be registered, wherein the display control unit highlights and displays the segment-representing image of the segment map selected as the cluster representation image of a cluster corresponding to the registered state.

8. The image processing apparatus according to claim 7, wherein,
when a reproduction operation is performed with respect to the segment-representing image selected as the cluster representation image of the cluster corresponding to the registered state, the reproduction control unit reproduces, in chronological order, the video segments corresponding to the segment-representing images associated with the clusters corresponding to all the registered states stored in the storage unit.

9. The image processing apparatus according to claim 3, wherein,
the display control unit sets the state on the segment map closest to an instructed position instructed by the user as a state of interest to be focused on and performs display control displaying, on the display apparatus, a tile image which is an image of a list of the segment-representing images associated with the clusters corresponding to the state of interest.

10. The image processing apparatus according to claim 9, wherein,
the display control unit sets the segment-representing image closest to the instructed position as an image of interest to be focused on from among the segment-representing images of the tile image and highlights and displays the image of interest.

11. The image processing apparatus according to claim 10, wherein,
according to a predetermined operation of a user, the display control unit performs display control displaying, on the display apparatus, a timeline image in which, from among the segment-representing images associated with the state of interest, the image of interest and a predetermined number of the segment-representing images continuing before and after the image of interest are arranged in chronological order with the image of interest as a center.

12. The image processing apparatus according to claim 11, wherein
the display control unit scrolls the segment-representing image arranged in the timeline image according to an operation of the user.

13. An image processing method comprising:
displaying, on a display apparatus, a segment map comprising segment-representing images representing video segments obtained by dividing content into video segments, wherein the video segments comprise collections of frames of one or more temporally continuous frames;
controlling reproduction of the video segments corresponding to the segment-representing images according to user input comprising a reproduction operation requesting reproduction with respect to the segment-representing images; and
clustering frames of the content into a plurality of clusters; wherein:
in the controlling of the reproduction of the video segment, in a case where, during the reproduction of a video segment of the content, a reproduction operation is detected with respect to a segment-representing image of an other video segment of the content, the other video segment, which corresponds to the segment-representing image with respect to which the reproduction operation is detected, is reproduced while maintaining the reproduction of the video segment being reproduced; and
the method further comprises:
determining a maximum likelihood state series in which characteristic amounts in chronological series of frames of the content are observed using a state transition model having states and state transitions, and
clustering each frame of the content into clusters corresponding to states in which characteristic amounts of the frames are observed in the maximum likelihood state series.

14. At least one non-transitory computer-readable medium storing computer-executable instructions that, when executed by at least one processor, cause a computer to execute a method comprising:
displaying, on a display apparatus, a segment map comprising segment-representing images representing video segments obtained by dividing content into video segments, wherein the video segments comprise collections of frames of one or more temporally continuous frames; and
controlling reproduction of the video segments corresponding to the segment-representing images according to user input comprising a reproduction operation requesting reproduction with respect to the segment-representing images; and
clustering frames of the content into a plurality of clusters; wherein:
in a case where, during reproduction of a video segment of the content, a reproduction operation is detected with respect to a segment-representing image of an other video segment of the content, the other video segment, which corresponds to the segment-representing image with respect to which the reproduction operation is detected, is reproduced while maintaining the reproduction of the video segment being reproduced; and
the method further comprises:
determining a maximum likelihood state series in which characteristic amounts in chronological series of frames of the content are observed using a state transition model having states and state transitions, and
clustering each frame of the content into clusters corresponding to states in which characteristic amounts of the frames are observed in the maximum likelihood state series.

* * * * *